(12) United States Patent
Momo et al.

(10) Patent No.: US 9,343,241 B2
(45) Date of Patent: May 17, 2016

(54) POWER STORAGE DEVICE

(75) Inventors: Junpei Momo, Kanagawa (JP);
Hiroatsu Todoriki, Kanagawa (JP);
Kuniharu Nomoto, Saitama (JP)

(73) Assignee: SEMICONDUCTOR ENERGY LABORATORY CO., LTD.,
Kanagawa-ken (JP)

( * ) Notice: Subject to any disclaimer, the term of this patent is extended or adjusted under 35 U.S.C. 154(b) by 0 days.

(21) Appl. No.: 13/569,411

(22) Filed: Aug. 8, 2012

(65) Prior Publication Data

US 2013/0052526 A1 Feb. 28, 2013

(30) Foreign Application Priority Data

Aug. 26, 2011 (JP) .................. 2011-185212

(51) Int. Cl.

| | |
|---|---|
| *H01G 11/32* | (2013.01) |
| *H01M 4/587* | (2010.01) |
| *H01M 10/052* | (2010.01) |
| *H01M 12/00* | (2006.01) |
| *H01M 2/34* | (2006.01) |
| *H01M 4/02* | (2006.01) |

(52) U.S. Cl.
CPC ............ *H01G 11/32* (2013.01); *H01M 4/587* (2013.01); *H01M 10/052* (2013.01); *H01M 12/005* (2013.01); *H01M 2/348* (2013.01); *H01M 2004/021* (2013.01); *Y02E 60/122* (2013.01); *Y02E 60/13* (2013.01); *Y02T 10/7011* (2013.01); *Y02T 10/7022* (2013.01)

(58) Field of Classification Search
None
See application file for complete search history.

(56) References Cited

U.S. PATENT DOCUMENTS

| | | | | |
|---|---|---|---|---|
| 5,772,974 | A | * | 6/1998 | Ohashi et al. ............... 423/447.7 |
| 6,300,008 | B1 | * | 10/2001 | Iijima et al. .................... 429/217 |
| 7,241,533 | B1 | | 7/2007 | Ikeda et al. |

(Continued)

FOREIGN PATENT DOCUMENTS

| | | |
|---|---|---|
| CN | 102197516 | 9/2011 |
| JP | 2004-349529 | 12/2004 |

(Continued)

OTHER PUBLICATIONS

"International Search Report (Application No. PCT/JP2010/070582; PCT15717) dated Nov. 20, 2012".

(Continued)

*Primary Examiner* — Patrick Ryan
*Assistant Examiner* — Carmen Lyles-Irving
(74) *Attorney, Agent, or Firm* — Nixon Peabody LLP; Jeffrey L. Costellia

(57) ABSTRACT

A power storage device with high output is provided, in which the specific surface area is increased while keeping the easy-to-handle particle size of its active material. The power storage device includes a positive electrode including a positive electrode current collector and a positive electrode active material layer, a negative electrode including a negative electrode current collector and a negative electrode active material layer, and an electrolyte. The negative electrode active material layer includes a negative electrode active material having a plurality of graphite particles. Each of the graphite particles consists of graphite layers that are overlapped with each other with a gap of 1 nm to 10 nm therebetween. It is preferable that the grain diameter of the particle be 1 μm to 50 μm. Further, the specific surface area of the particles is 20 $m^2/g$ to 200 $m^2/g$.

14 Claims, 16 Drawing Sheets

(56) References Cited

U.S. PATENT DOCUMENTS

| | | | |
|---|---|---|---|
| 2005/0206293 A1* | 9/2005 | Taomoto et al. | 313/346 R |
| 2007/0224479 A1* | 9/2007 | Tadokoro et al. | 429/30 |
| 2009/0053593 A1* | 2/2009 | Yamamoto et al. | 429/163 |
| 2009/0246624 A1* | 10/2009 | Kojima et al. | 429/207 |
| 2009/0269667 A1* | 10/2009 | Antonietti et al. | 429/231.4 |
| 2009/0311599 A1* | 12/2009 | Kawai et al. | 429/217 |
| 2010/0086837 A1 | 4/2010 | Asari et al. | |
| 2011/0159362 A1 | 6/2011 | Wakizaki et al. | |
| 2011/0212363 A1 | 9/2011 | Yamazaki et al. | |
| 2011/0236757 A1 | 9/2011 | Yukawa et al. | |
| 2011/0294011 A1 | 12/2011 | Kuriki et al. | |
| 2012/0002348 A1 | 1/2012 | Momo et al. | |
| 2012/0003383 A1 | 1/2012 | Furuno | |
| 2012/0003538 A1 | 1/2012 | Yamakaji | |
| 2012/0021294 A1* | 1/2012 | Zhamu et al. | 429/231.8 |
| 2012/0052386 A1* | 3/2012 | Ookita et al. | 429/215 |
| 2012/0088151 A1 | 4/2012 | Yamazaki et al. | |
| 2012/0088156 A1 | 4/2012 | Nomoto et al. | |

FOREIGN PATENT DOCUMENTS

| | | |
|---|---|---|
| JP | 2010-135361 | 6/2010 |
| WO | WO-2010/024328 A1 | 3/2010 |

OTHER PUBLICATIONS

"Written Opinion (Application No. PCT/JP2012/070582; PCT15717) dated Nov. 20, 2012".

* cited by examiner

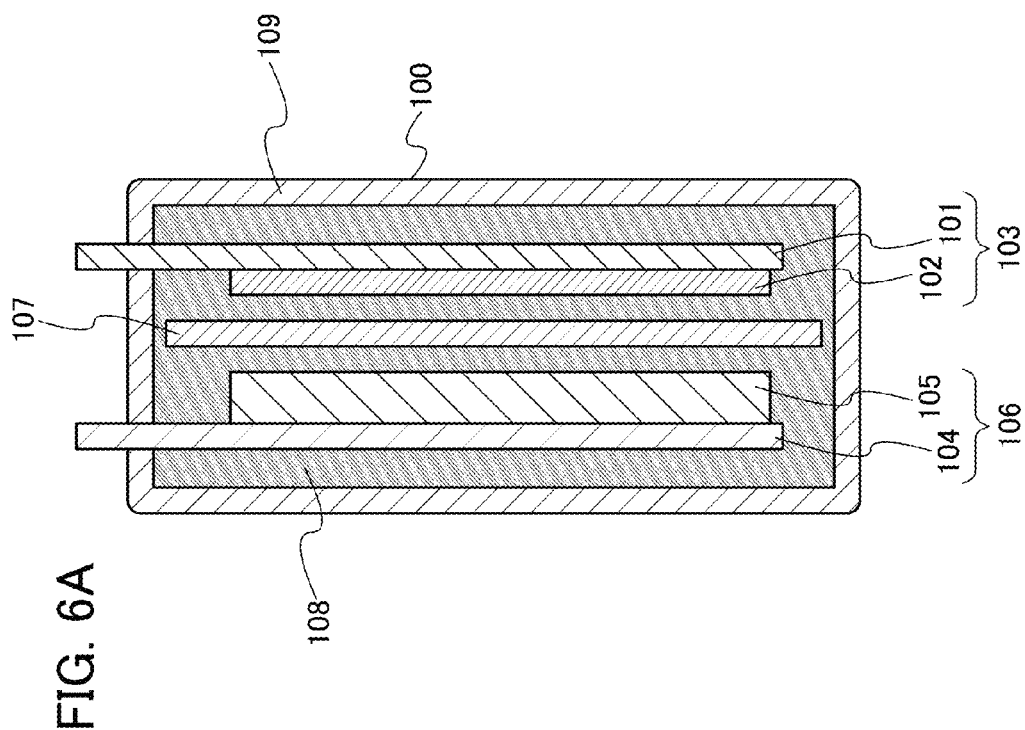
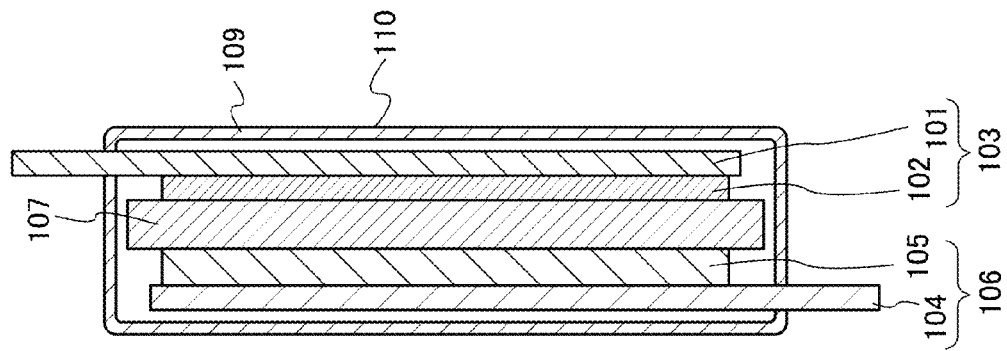

POWER STORAGE DEVICE

TECHNICAL FIELD

The present invention relates to power storage devices.

BACKGROUND ART

In recent years, along with an increase in demand for mobile electronic devices such as a mobile phone or a laptop computer and development of an electric vehicle (EV) and the like, a demand for power storage devices such as an electric double layer capacitor (EDLC), a lithium-ion rechargeable battery (LIB), and a lithium ion capacitor (LIC) has been significantly increased.

The electric double layer capacitor (EDLC) is a capacitor using an electric double layer capacitance; its capacitance is very high among capacitances of capacitors. The electric double layer capacitor (EDLC), which requires no electrochemical reaction, features high stability and high durability such as a long cycle life. However, the energy density of the EDLC as a power storage device is inferior to that of a lead battery, though the EDLC has better characteristics as a capacitor.

In view of the above, a lithium ion capacitor (LIC) has been proposed, which is a hybrid capacitor consisting of a capacitor and a battery, in which graphite where intercalation and deintercalation of lithium ions occur are used for the negative electrode and an electric double layer capacitance is used for the positive electrode. The lithium ion capacitor (LIC) whose negative electrode has a very low potential due to doping (predoping) of lithium to the negative electrode can operate to output a high voltage of about 2 V to 4 V; therefore, the lithium ion capacitor (LIC) has an energy density far higher than that of EDLC.

REFERENCE

Patent Document 1: Japanese Published Patent Application No. 2010-135361

DISCLOSURE OF INVENTION

The energy density of the LIC is lower than that of the battery, though being higher than that of the EDLC. The feature of the LIC lies in its stability, durability, and high output; particularly, the high output is an important determinant of a method for using the capacitor.

Output characteristics of a capacitor are governed by its internal resistance. The internal resistance of the LIC which uses intercalation and deintercalation of lithium ions for the negative electrode is higher than that of the EDLC which uses electric double layers for both of the positive electrode and the negative electrode. Although the highness of the output voltage offsets the highness of the internal resistance, the highness of the internal resistance leads to deterioration of the output characteristics; thus, reducing the internal resistance is very important for the capacitor.

To further increase the output of the LIC, it is necessary to increase the reacting amount of intercalation and deintercalation of lithium ions for the negative electrode. Increase of the reactivity and increase of the reactive area are given as examples of a method for increasing the reacting amount of intercalation and deintercalation of lithium ions.

As examples of a method for increasing the reactivity, decrease of the activation energy in the intercalation and deintercalation of lithium ions and increase of the system temperature (heating of the cell) are given. The activation energy, which depends on a variety of elements such as a material, an electrolyte, and a surface covering film, is difficult to control, and an increase of the cell temperature makes the operating environment limited, though decreasing the resistance.

As an example of a method for increasing the reactive area, decrease in the grain diameter of an active material is generally given. The specific surface area of the particle of the active material increases as the grain diameter is decreased; thus, reduction in the grain diameter of the active material to a nanoscale can lead to a very large specific surface area. However, powder of nanoparticles is very difficult to prepare and handle, making it difficult to fabricate an electrode.

In view of the above, one object of one embodiment of the present invention is to provide a power storage device with high output, in which the specific surface area is increased while keeping an easy-to-handle particle size of an active material.

Graphite oxide is used to produce an active material in one embodiment of the present invention. The graphite oxide is preferably prepared by a modified Hummers method.

Ultrasonic waves are applied to graphite oxide to foliate the graphite oxide. Next, an aqueous solution of zinc chloride is added to the foliated graphite oxide, whereby zinc chloride is penetrated between the slices of graphite oxide. Baking is performed thereon, whereby the foliated graphite oxide is reduced to be foliated graphite. In this step, the plurality of slices of graphite is overlapped with each other and sintered; accordingly, a particle in which the plurality of slices of graphite is overlapped with each other with a gap (also called a pore) therebetween is formed. In this specification and the like, such a particle in which a plurality of slices of graphite is overlapped with each other with a gap therebetween is referred to as porous graphite. With the baking, chlorine in zinc chloride between the plurality of slices of graphite is evaporated in the form of $Cl_2$ or HCl, and zinc in zinc chloride between the plurality of slices of graphite is oxidized to be zinc oxide. The zinc oxide is removed, and the porous graphite is ground into pieces. The resulting porous graphite can be used as an active material.

The grinding of the porous graphite into pieces enables the grain diameter of the particle to be 1 μm to 50 μm. Further, the gap between the slices of graphite can be controlled to 1 nm to 10 nm. Furthermore, the specific surface area of the particle can be controlled to 20 $m^2$/g to 200 $m^2$/g.

The particle may be further baked after being ground into pieces; that baking can increase the crystallinity of the particle.

The ultrasonic waves may be applied to the graphite oxide after the aqueous solution of zinc chloride is added to the graphite oxide. Accordingly, the dispersibility of graphite oxide and zinc chloride can be increased.

Microparticulation of an active material is controlled by preparation of graphite oxide and adjustment of ultrasonic wave application, and an area of a gap, which is in contact with an electrolyte, formed by adding zinc chloride to the graphite oxide is adjusted, whereby an active material with large grain diameter (μm) and large surface area can be produced.

With the above-described active material, power storage devices such as a lithium ion capacitor and a lithium ion secondary battery can be manufactured.

A power storage device according to one embodiment of the present invention includes a positive electrode including a positive electrode current collector and a positive electrode active material layer, a negative electrode including a negative electrode current collector and a negative electrode active material layer, and an electrolyte. The negative electrode active material layer includes a negative electrode active material which is a particle in which a plurality of slices of graphite is overlapped with each other with a gap therebetween.

A power storage device according to one embodiment of the present invention includes a positive electrode including a positive electrode current collector and a positive electrode active material layer, a negative electrode including a negative electrode current collector and a negative electrode active material layer, and an electrolyte. The positive electrode active material layer includes a positive electrode active material which is a particle in which a plurality of slices of graphite is overlapped with each other with a gap therebetween.

A power storage device according to one embodiment of the present invention includes a positive electrode including a positive electrode current collector and a positive electrode active material layer, a negative electrode including a negative electrode current collector and a negative electrode active material layer, and an electrolyte. The negative electrode active material layer includes a negative electrode active material which is a particle in which a plurality of slices of graphite is overlapped with each other with a gap therebetween. The positive electrode active material layer includes a positive electrode active material which is a particle in which a plurality of slices of graphite is overlapped with each other with a gap therebetween.

In each of the above-described structures, it is preferable that the grain diameter of the particle be 1 μm to 50 μm. Further, in each of the above-described structures, it is preferable that the electrolyte be in contact with the gap between the slices of graphite. Further, in each of the above-described structures, it is preferable that the gap be 1 nm to 10 nm. Furthermore, in each of the above-described structures, it is preferable that the specific surface area of the particle be 20 $m^2/g$ to 200 $m^2/g$.

The "active material" refers only to a material that relates to intercalation and deintercalation of ions functioning as carriers. In this specification and the like, an active material used for a positive electrode, with a conductive additive, a binder, or the like is referred to as the "positive electrode active material layer". The same applies to the negative electrode active material layer; an active material used for a negative electrode, with a conductive additive, a binder, or the like is referred to as the "negative electrode active material layer".

According to one embodiment of the present invention, an active material with an easy-to-handle grain diameter and a large specific surface area can be produced. Further, an active material with a large specific surface area can be produced without being downsized to a nanoscale, making it possible to fabricate an electrode easily. Furthermore, such an active material with a large specific surface area enables the resistance of the electrode to be low. Further, such a decrease of the resistance of the electrode enables a power storage device with a high output to be achieved by predoping.

BRIEF DESCRIPTION OF DRAWINGS

In the accompanying drawings:

FIGS. 6A and 6B illustrate power storage devices;

BEST MODE FOR CARRYING OUT THE INVENTION

Figure 1:
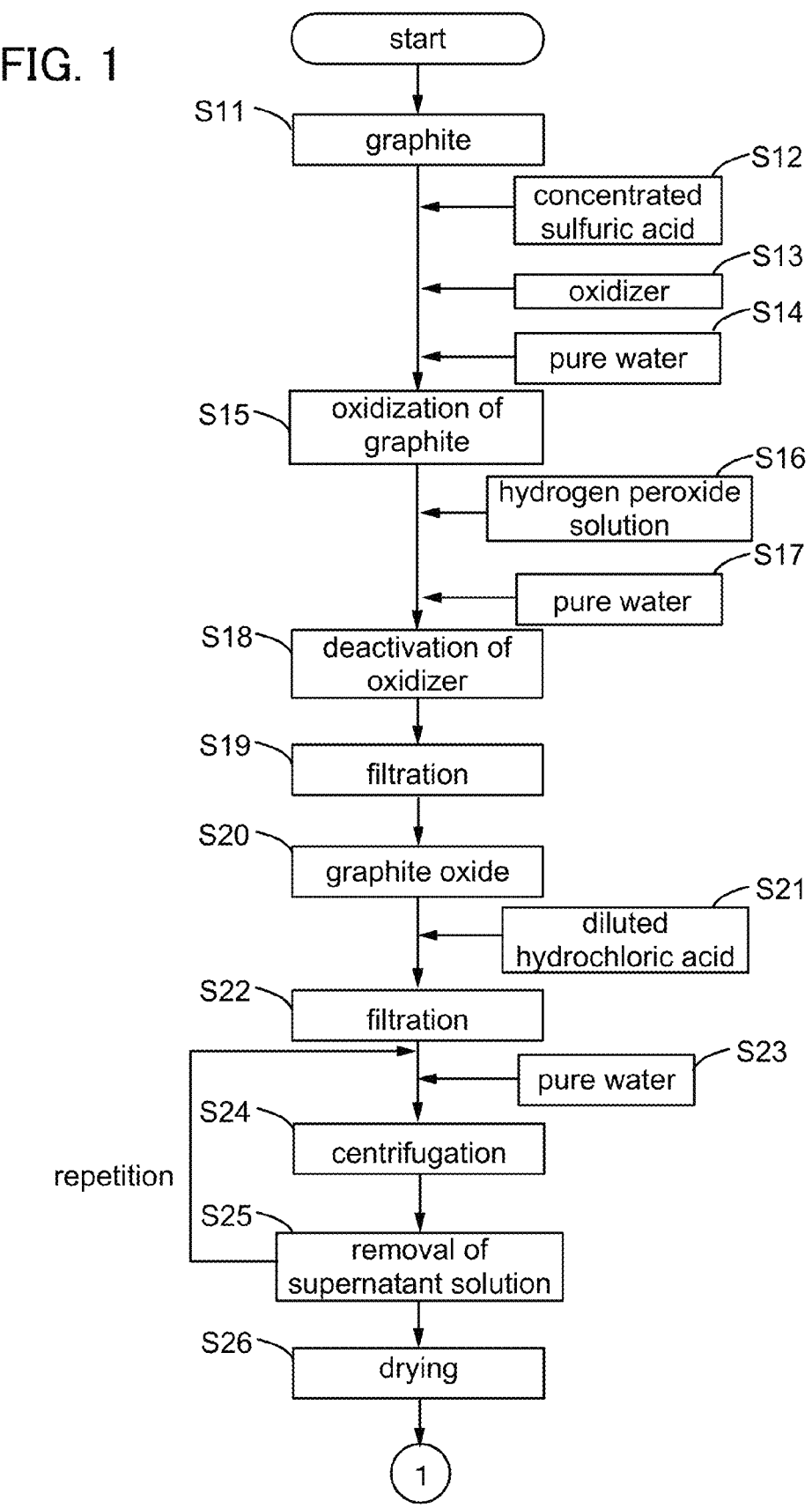
FIG. 1 is a flowchart illustrating a method for producing an active material.

Hereinafter, embodiments of the present invention are described with reference to the drawings. However, the present invention is not limited to the following description. It will be easily understood by those skilled in the art that the mode and detail can be variously changed unless departing from the scope and spirit of the present invention. Therefore, the present invention is not construed as being limited to the following description of Embodiments and Example. Reference numerals denoting portions are shared throughout the drawings.

The size, the thickness of each layer, and each region of each structure illustrated in the drawings and the like in the embodiments are exaggerated for simplicity in some cases. Therefore, embodiments of the present invention are not limited by such scales.

Further, ordinal numbers such as first, second, and third in this specification are used in order to identify components, and thus do not limit the number or order of the components.

Embodiment 1

Figure 2:
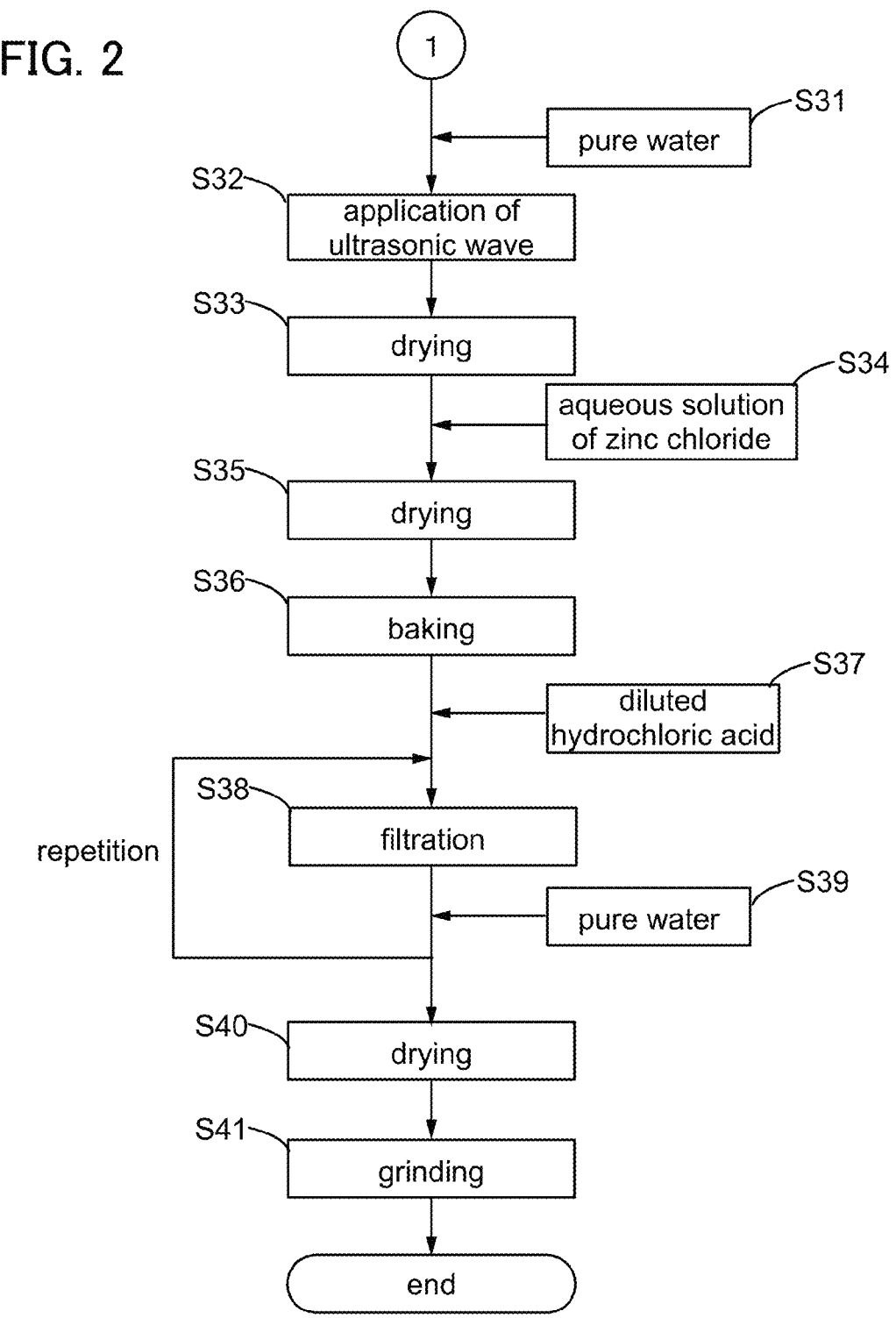
FIG. 2 is a flowchart illustrating a method for producing an active material.

One example of a method for producing an active material for a power storage device according to one embodiment of the present invention is described using FIGS. 1 and 2.

First, a method for producing graphite oxide is described using FIG. 1.

Graphite oxide can be produced by a modified Hummers method. Graphite oxide can also be produced by a Brodie method, a Staudenmaier method, or the like.

The modified Hummers method is a method by which graphite is oxidized with concentrated sulfuric acid and potassium permanganate. The Brodie method is a method by which graphite is oxidized with nitric acid and potassium chlorate. The Staudenmaier method is a method by which graphite is oxidized with nitric acid, sulfuric acid, and potassium chlorate.

An example of a method for producing graphite oxide by the modified Hummers method is described below.

First, powder of graphite is prepared (Step S11). Flake graphite with an average grain diameter of 1 μm to 100 μm may be used as the graphite. Next, powder of the graphite is added to concentrated sulfuric acid, and the resulting mixture is stirred in an ice bath (Step S12). Then, potassium permanganate is slowly added thereto as an oxidizer and stirred, and then, the mixture is taken out of the ice bath and reacted at room temperature for 2 hours, and then reacted at temperatures of from 30° C. to 35° C. for 30 minutes (Step S13). Next, pure water is added thereto, and the resulting aqueous solution is heated at about 98° C. for 15 minutes (Step S14). Accordingly, the graphite is oxidized to be graphite oxide (Step S15). Next, a hydrogen peroxide solution is added thereto (Step S16), and pure water is further added to the mixture (Step S17), whereby the oxidizer is deactivated (Step S18). The resulting suspension contains a sulfate ion, a manganese ion, and the like in addition to graphite oxide. The suspension is subjected to suction filtration, whereby most of water-soluble ions is removed and a residue is obtained (Step S19). Accordingly, graphite oxide including impurities can be yielded (Step S20).

Next, diluted hydrochloric acid is added to the graphite oxide including impurities (Step S21), and the resulting mixture is subjected to suction filtration (Step S22). Accordingly, the sulfate ion and the manganese ion included in the graphite oxide can be removed. After that, pure water is added to the resulting residue (Step S23).

Next, the suspension obtained at Step S23 is subjected to centrifugation at 3000 rpm for 30 minutes (Step S24). The centrifugation of the suspension yields sediment. The resulting supernatant solution contains a large amount of hydrochloric acid; therefore, the supernatant solution is removed (Step S25).

Next, the process from Step S23 to Step S25 is repeated 4 or 5 times. Accordingly, unnecessary ions and the like other than graphite oxide can be removed.

The resulting graphite oxide, from which unnecessary ions and the like have been removed, is dried (Step S26). Through the above-described process, graphite oxide can be produced (circled 1).

Figure 3:
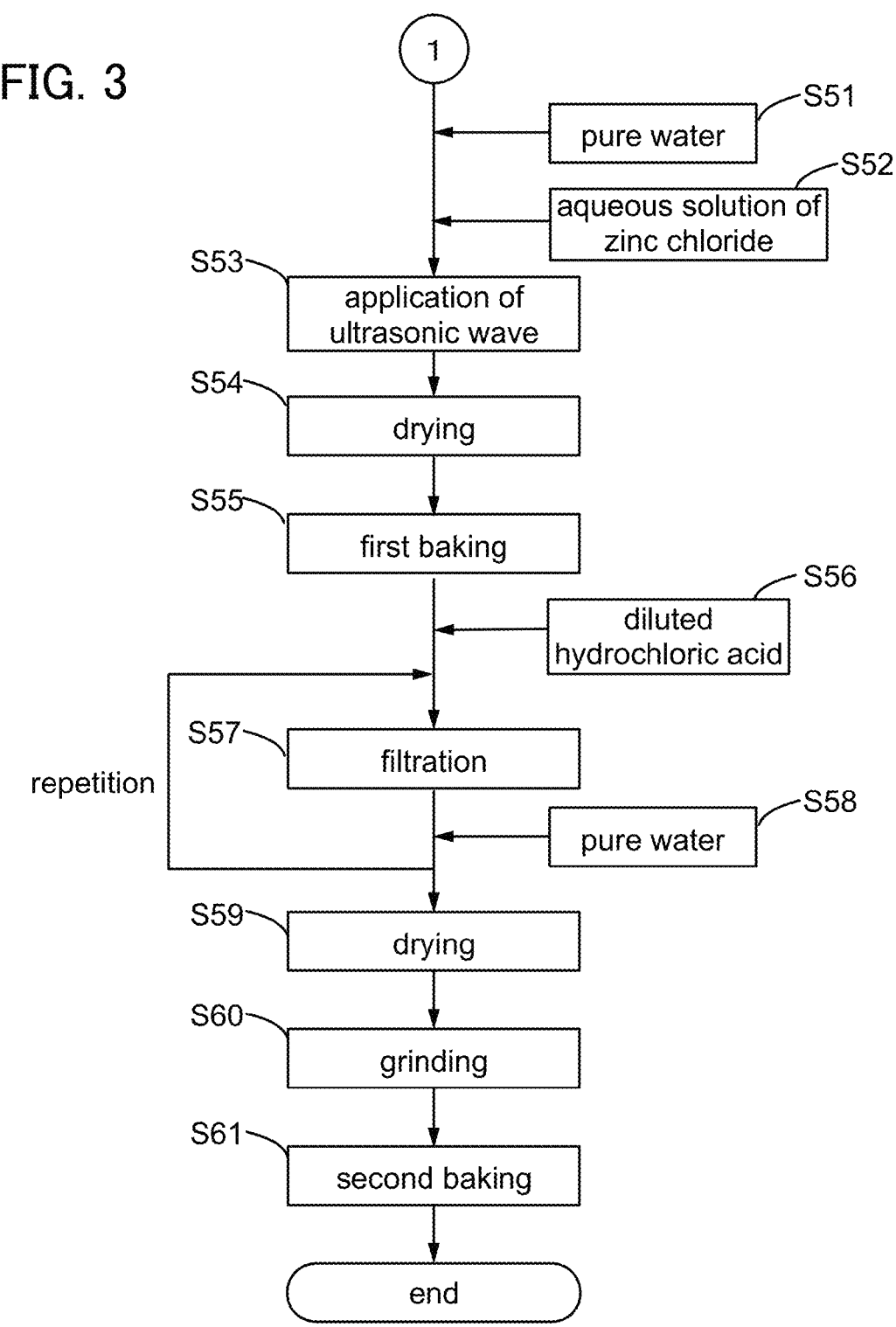
FIG. 3 is a flowchart illustrating a method for producing an active material.

Next, a method for producing an active material from graphite oxide is described using FIGS. 2 and 3.

First, pure water is added to graphite oxide, whereby a suspension containing the graphite oxide is prepared (Step S31).

Next, ultrasonic waves are applied to the suspension containing the graphite oxide (Step S32). Accordingly, the layer structure of the graphite oxide is broken, foliating the graphite oxide into slices. After that, the suspension containing the foliated graphite oxide is dried (Step S33).

Next, an aqueous solution of zinc chloride is added to the dried graphite oxide and the resulting mixture is stirred, whereby zinc chloride is dispersed to the graphite oxide (Step S34). Accordingly, zinc chloride is penetrated between the slices of graphite oxide. After that, this suspension is dried to yield a mixture of graphite oxide and zinc chloride (Step S35).

Although an example in which zinc chloride is used is described in this embodiment, transition metal chloride such as cobalt chloride or nickel chloride may be used instead.

Next, the mixture of graphite oxide and zinc chloride is put in a boat made of alumina and baked (Step S36). The baking is, for example, performed at temperatures of from 300° C. to 650° C. for 1 hour to 48 hours in an inert atmosphere (such as a nitrogen atmosphere or a rare gas atmosphere), in a reducing atmosphere (such as a hydrogen atmosphere), or under reduced pressure. In this specification and the like, the reduced pressure refers to a pressure of 10 Pa or less.

The baking reduces the foliated graphite oxide, yielding foliated graphite. In this step, a plurality of slices of graphite is overlapped with each other and sintered; accordingly, a particle in which the plurality of slices of graphite is overlapped with each other with a gap therebetween is formed. In this specification and the like, such a particle in which a plurality of slices of graphite is overlapped with each other with a gap therebetween is referred to as porous graphite. With the baking, chlorine in the zinc chloride between the plurality of slices of graphite becomes $Cl_2$ or HCl and evaporates, and zinc in the zinc chloride between the plurality of slices of graphite is oxidized to be zinc oxide. Similarly, in the case where transition metal chloride such as cobalt chloride or nickel chloride is used instead of the zinc chloride, the transition metal in the transition metal chloride is oxidized to be transition metal oxide by the baking.

Next, diluted hydrochloric acid is added to the porous graphite (Step S37), and the resulting mixture is subjected to suction filtration to remove zinc oxide from the porous graphite (Step S38). After that, pure water is added thereto (Step S39), and the resulting solution is subjected to suction filtration (Step S38) to remove hydrochloric acid. In this manner, the process from Step S38 to Step S39 is repeated plural times, whereby hydrochloric acid and zinc oxide can be removed from the porous graphite.

The resulting porous graphite, from which hydrochloric acid and zinc oxide have been removed, is dried (Step S40). After that, the dried porous graphite is ground into pieces (Step S41). Through the above-described process, an active material for a power storage device according to one embodiment of the present invention can be produced.

The grain diameter of the particle produced by the above-described process can be 1 μm to 50 μm. Further, the gap between the slices of graphite is 1 nm to 10 nm. This gap corresponds to a gap which can be in contact with an electrolyte for the power storage device. Further, the overlapping of the plurality of slices of graphite with each other with the gap enables the specific surface area of the particle to be 20 $m^2/g$ to 200 $m^2/g$.

Microparticulation of an active material is controlled by preparation of graphite oxide and adjustment of ultrasonic wave application, and an area of a gap, which is in contact with an electrolyte, formed by adding zinc chloride to the graphite oxide is adjusted, whereby an active material with large grain diameter (μm) and large surface area can be produced.

Next, another example of a method for producing an active material for a power storage device according to one embodiment of the present invention is described using FIGS. 1 and 3.

First, graphite oxide is prepared. For a method for producing the graphite oxide, refer to the process from Step S11 to Step S26 (FIG. 1); thus, detailed description thereof is skipped.

Pure water is added to the graphite oxide produced by the process from Step S11 to Step S26, whereby a suspension containing the graphite oxide is prepared (Step S51).

Next, an aqueous solution of zinc chloride is added to the suspension containing the graphite oxide, and the resulting suspension is stirred (Step S52). Then, ultrasonic waves are applied to the suspension of the zinc chloride and the graphite oxide (Step S53). The dispersibility of graphite oxide and zinc chloride can be increased by application of ultrasonic waves after the aqueous solution of the zinc chloride is added to the suspension containing the graphite oxide.

The following process from drying of the graphite oxide to grinding of porous graphite into pieces (Step S54 to Step S60)

can be performed in a similar manner to the process from Step S35 to Step S41 described in FIG. 2; thus, detailed description thereof is skipped.

Next, second baking is performed on the ground porous graphite (Step S61). The second baking is performed, for example, at temperatures of from 650° C. to 1200° C. for 0.5 hours to 48 hours in an inert atmosphere (such as a nitrogen atmosphere or a rare gas atmosphere), in a reducing atmosphere (such as a hydrogen atmosphere), or under reduced pressure. The second baking is performed at the higher temperature than the previous first baking, whereby the crystallinity of the porous graphite can be improved. Through the above process, an active material for a power storage device according to one embodiment of the present invention can be produced.

Figure 4:
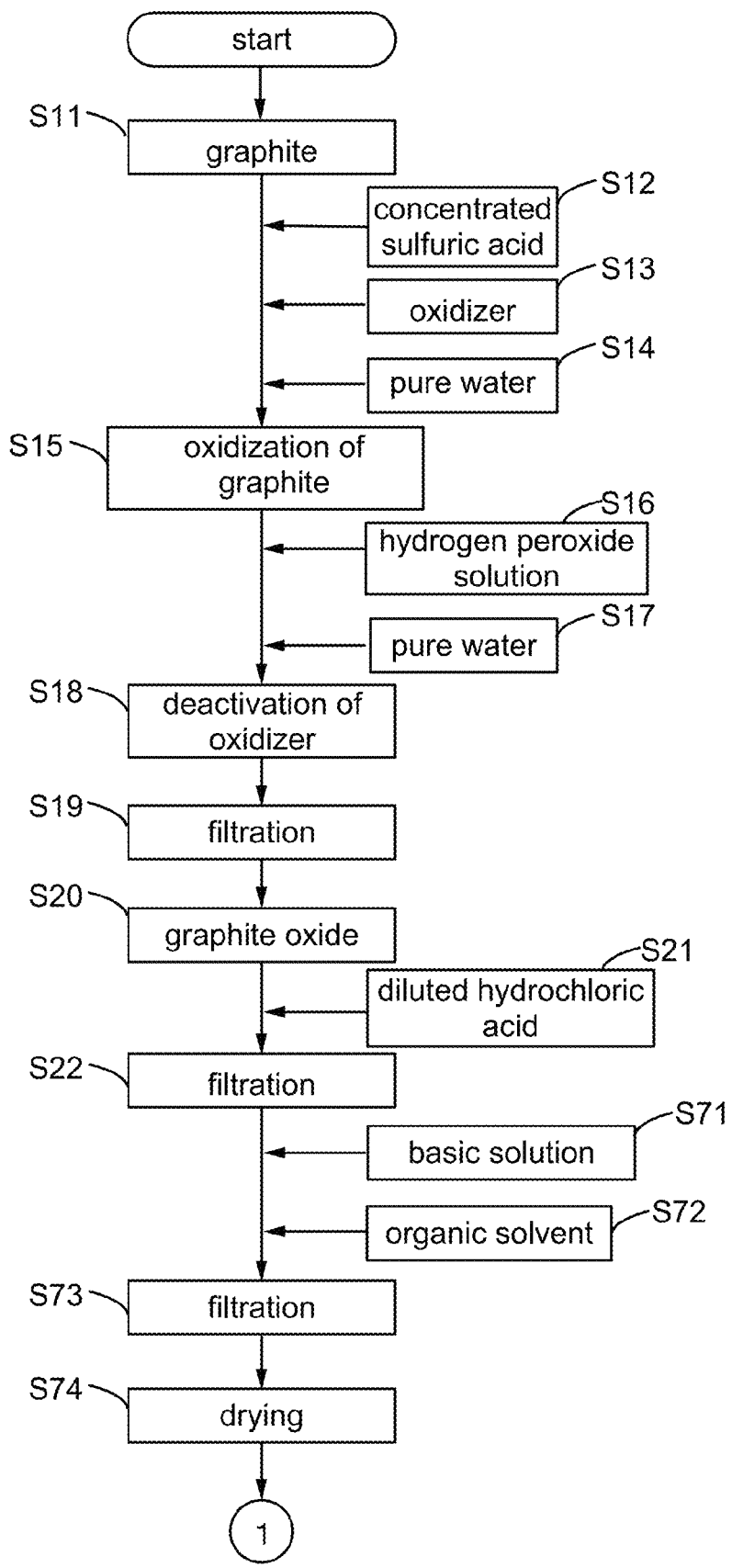
FIG. 4 is a flowchart illustrating a method for producing an active material.

Next, an example of a method for producing graphite oxide, part of which is different from the method for producing graphite oxide described in FIG. 1 is described using FIG. 4.

The process from Step S11 to Step S22 can be performed in a similar manner to the process from Step S11 to Step S22 described in FIG. 1; thus, detailed description thereof is skipped.

Next, an ammonia aqueous solution is added as a basic solution to the residue obtained by Step S22 (Step S71). After that, acetone is added thereto as an organic solvent (Step S72). The residue obtained by Step S22 is acid. Adding acetone to the residue as an organic solvent does not bring about aggregation of graphite oxide easily, so that graphite oxide is difficult to obtain. Hence, the ammonia aqueous solution is added as a basic solution to the residue obtained by Step S22, whereby graphite oxide salt can be yielded; then, the acetone is added thereto as an organic solvent, whereby graphite oxide salt can be aggregated.

After that, the resulting suspension is subjected to suction filtration (Step S73), and the obtained residue is dried (Step S74). Through the above process, graphite oxide can be produced (circled 1).

According to the producing method described in FIG. 4, unlike the producing method described in FIG. 1, the repetitive process in which the suspension is subjected to centrifugation to separate the suspension and the resulting supernatant solution is removed is not involved, which improves productivity of graphite oxide.

Figure 5:
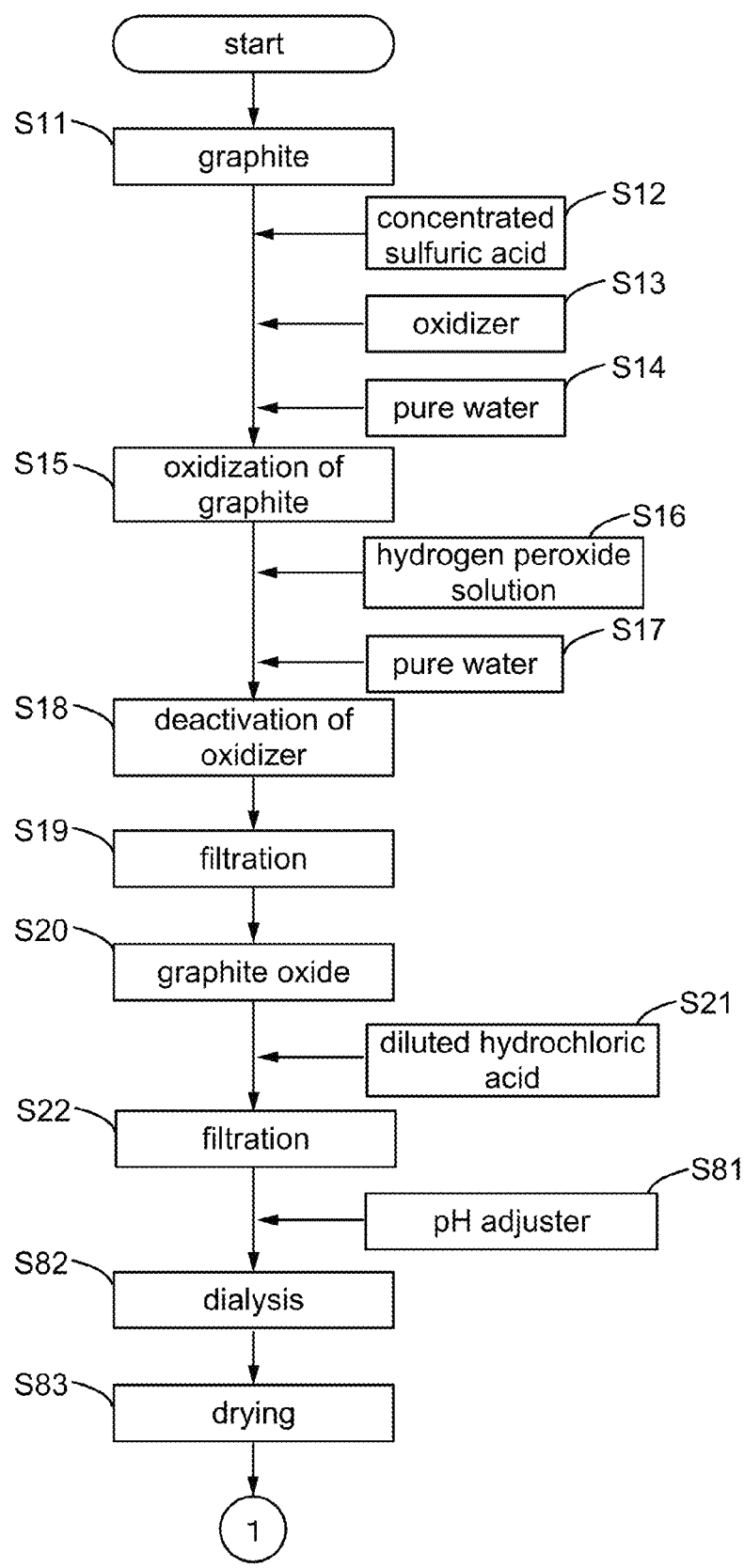
FIG. 5 is a flowchart illustrating a method for producing an active material.

Next, an example of a method for producing graphite oxide, part of which is different from the methods for producing graphite oxide described in FIGS. 1 and 4 is described using FIG. 5.

The process from Step S11 to Step S22 can be performed in a similar manner to the process from Step S11 to Step S22 described in FIG. 1; thus, detailed description thereof is skipped.

Next, the residue obtained by Step S22 is acid and contains a chlorine ion. Electrodialysis is used to remove the chlorine ion. It is preferable that the hydrogen ion concentration in the solution to be subjected to the electrodialysis be pH6 to pH8, for which a pH adjuster is used (Step S81). Any kind of alkaline solution or alkaline salt can be used as the pH adjuster; for example, sodium hydroxide, potassium hydroxide, calcium hydroxide, lithium hydroxide, ammonium hydroxide, sodium carbonate, potassium carbonate, calcium carbonate, or lithium carbonate may be used.

Depending on the application of graphite oxide, cations contained in the pH adjuster may behave as an impurity which deteriorates characteristics of a power storage device. Most of the cations contained in the pH adjuster can be removed by the electrodialysis; however, a small number of cations may be left in graphite oxide.

For example, for an application of graphite oxide as a material for a lithium ion capacitor, it is preferable to use, as the pH adjuster, lithium hydroxide or lithium carbonate rather than sodium hydroxide, potassium hydroxide, calcium hydroxide, sodium carbonate, potassium carbonate, or calcium carbonate.

Next, the electrodialysis is performed thereon to separate graphite oxide and unnecessary ions (Step S82).

Then, the resulting graphite oxide is dried (Step S83). Through the above process, graphite oxide can be produced (circled 1).

According to the producing method described in FIG. 5, unlike the producing method described in FIG. 1, the repetitive process in which the suspension is subjected to centrifugation to separate the suspension and the resulting supernatant solution is removed is not involved, which improves productivity of graphite oxide.

This embodiment can be implemented in appropriate combination with any other embodiment.

Embodiment 2

In this embodiment, a method for fabricating a power storage device according to one embodiment of the present invention is described.

In this embodiment, one embodiment of a lithium ion capacitor as one example of a power storage device is described using FIGS. 6A and 6B, FIG. 7, and FIG. 8.

A power storage device 100 illustrated in FIG. 6A includes a positive electrode 103 including a positive electrode current collector 101 and a positive electrode active material layer 102, a negative electrode 106 including a negative electrode current collector 104 and a negative electrode active material layer 105, a separator 107, an electrolyte 108, and a housing 109. The separator 107 is placed between the positive electrode 103 and the negative electrode 106 in a space surrounded by the housing 109. The space surrounded by the housing 109 is filled with the electrolyte 108.

The positive electrode active material layer 102 may contain a binder, a conductive additive, and the like in addition to a positive electrode active material. As the positive electrode active material, the particle in which a plurality of slices of graphite is overlapped with each other with a gap therebetween, which is described in Embodiment 1, can be used. The negative electrode active material layer 105 may contain a binder, a conductive additive, and the like in addition to a negative electrode active material. As the negative electrode active material, the particle in which a plurality of slices of graphite is overlapped with each other with a gap therebetween, which is described in Embodiment 1, can be used. In the power storage device according to one embodiment of the present invention, the particle described in Embodiment 1 is preferably used at least one of the positive electrode active material and the negative electrode active material.

For the positive electrode current collector 101, a conductive material can be used, for example. Examples of the conductive material include aluminum (Al), copper (Cu), nickel (Ni), and titanium (Ti). In addition, an alloy material including two or more of the above-described conductive materials can be used for the positive electrode current collector 101: examples of the alloy material include an Al—Ni alloy and an Al—Cu alloy. The positive electrode current collector 101 can have any shape such as a foil shape, a plate shape, or a net shape as appropriate. Further, the positive electrode current collector 101 can be formed in such a manner that a conductive layer is formed over a substrate, and the conductive layer is separated from the substrate.

As the positive electrode active material of the positive electrode active material layer 102, the particle in which a plurality of slices of graphite is overlapped with each other with a gap therebetween (the particle referred to as porous graphite), described in Embodiment 1, can be used. An activated carbon can also be used. Alternatively, a material containing ions to serve as carriers and a transition metal can be used. As the material containing ions to serve as carriers and a transition metal, a material represented by a general formula $A_hM_iPO_j$ (h>0, i>0, j>0) can be used, for example. In the formula, A represents, for example, an alkaline metal such as lithium, sodium, or potassium; an alkaline earth metal such as calcium, strontium, or barium; beryllium; or magnesium. In addition, M represents a transition metal such as iron, nickel, manganese, or cobalt, for example. Examples of the material represented by the general formula $A_hM_iPO_j$ (h>0, i>0, j>0) include lithium iron phosphate and sodium iron phosphate. The material represented by A and the material represented by M may be respective ones or more of their respective above-described materials.

A material represented by a general formula $A_hM_iO_j$ (h>0, i>0, j>0) can also be used as the positive electrode active material. In the formula, A represents, for example, an alkaline metal such as lithium, sodium, or potassium; an alkaline earth metal such as calcium, strontium, or barium; beryllium; or magnesium. Further, M represents a transition metal such as iron, nickel, manganese, or cobalt. Examples of the material represented by the general formula $A_hM_iO_j$ (h>0, i>0, j>0) include lithium cobaltate, lithium manganate, and lithium nickelate. The material represented by A and the material represented by M may be respective ones or more of their respective above-described materials.

In the case of a lithium ion capacitor, a material containing lithium is selected as its positive electrode active material. In other words, A in the above-described general formulae $A_hM_iPO_j$ (h>0, i>0, j>0) or $A_hM_iO_j$ (h>0, i>0, j>0) is lithium.

As the conductive additive, an electron-conductive material which does not cause chemical change in the power storage device is used. For example, a carbon-based material such as carbon black (such as acetylene black or ketjen black), graphite, or carbon fiber; a metal material such as copper, nickel, aluminum, or silver; or powder, fiber, or the like of mixtures thereof can be used.

As examples of the binder, polysaccharides such as starch, carboxymethyl cellulose, hydroxypropyl cellulose, regenerated cellulose, or diacetyl cellulose; vinyl polymers such as polyvinyl chloride, polyethylene, polypropylene, polyvinyl alcohol, polyvinyl pyrrolidone, polytetrafluoroethylene, polyvinylide fluoride (PVDF), ethylene-propylene-diene monomer (EPDM) rubber, sulfonated EPDM rubber, styrene-butadiene rubber, butadiene rubber, and fluorine rubber; polyether such as polyethylene oxide; and the like can be given.

For the negative electrode current collector 104, a conductive material can be used, for example. As the conductive material, aluminum (Al), copper (Cu), nickel (Ni), or titanium (Ti) can be used. In addition, an alloy material including two or more of the above-described conductive materials can be used for the positive electrode current collector 101. As the alloy material, an Al—Ni alloy, an Al—Cu alloy, or the like can be used. The negative electrode current collector 104 can have any shape such as a foil shape, a plate shape, or a net shape as appropriate. Further, the negative electrode current collector 104 can be formed in such a manner that a conductive layer is formed over a substrate, and the conductive layer is separated from the substrate.

As the negative electrode active material of the negative electrode active material layer 105, the particle in which a plurality of slices of graphite is overlapped with each other with a gap therebetween (the particle referred to as porous graphite), described in Embodiment 1, can be used. There is no particular limitation on the material for the negative electrode active material layer 105 as long as it is a material with which metal can be dissolved/precipitated or a material into/from which metal ions can be intercalated and deintercalated. As the negative electrode active material of the negative electrode active material layer 105, a lithium metal, a carbon-based material, silicon, a silicon alloy, or tin can be used, for example. As the carbon-based material into/from which a lithium ion can be intercalated and deintercalated, a fine graphite powder, a graphite fiber, graphite, or the like can be used.

The negative electrode active material layer 105 is doped with lithium (predoping). The predoping of lithium to the negative electrode active material layer 105 enables a power storage device to have high output.

The electrolyte 108 includes a nonaqueous solvent and electrolyte salt.

The electrolyte salt dissolved in the nonaqueous solvent may be electrolyte salt which includes ions to serve as carriers and is compatible with the positive electrode active material layer 102. The electrolyte salt may be electrolyte salt including an alkali metal ion, an alkaline earth metal ion, a beryllium ion, or a manganese ion. As examples of the alkali metal ion, a lithium ion, a sodium ion, and a potassium ion are given. As examples of the alkaline earth metal ion, a calcium ion, a strontium ion, and a barium ion are given. In the case where a material containing lithium is used for the positive electrode active material layer 102, electrolyte salt containing a lithium ion (hereinafter also referred to as electrolyte salt containing lithium) is preferably selected. In the case where a material containing sodium is used for the positive electrode active material layer 102, electrolyte salt containing sodium is preferably selected.

As the electrolyte salt containing lithium, lithium chloride (LiCl), lithium fluoride (LiF), lithium perchlorate (LiClO$_4$), lithium fluoroborate (LiBF$_4$), LiAsF$_6$, LiPF$_6$, Li(CF$_3$SO$_2$)$_2$N, or the like can be used.

As the non-aqueous solvent, a mixed solvent of ethylene carbonate (EC) and diethyl carbonate (DEC), an ionic liquid containing quaternary ammonium-based cations, an ionic liquid containing imidazolium-based cations, or the like can be used.

As the separator 107, paper, nonwoven fabric, a glass fiber, a synthetic fiber such as nylon (polyimide), vinylon (a polyvinyl alcohol based fiber), polyester, acrylic, polyolefin, or polyurethane, or the like may be used. However, it is necessary that a material which does not dissolve in the electrolyte 108 is used.

As the separator 107, for example, fluorine-based polymer, polyether such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, or nonwoven fabric can be used either alone or in combination.

For the housing 109, one or more selected from a laminate film, a polymer film, a metal film, a metal case, a plastic case, and the like can be used.

Next, a power storage device 110, which has a structure different from the power storage device 100 illustrated in FIG. 6A, is described using FIG. 6B.

The power storage device 110 illustrated in FIG. 6B is similar to the power storage device 100 illustrated in FIG. 6A in that it includes a positive electrode 103 including a positive electrode current collector 101 and a positive electrode active material layer 102, a negative electrode 106 including a negative electrode current collector 104 and a negative electrode active material layer 105, a separator 107, an electrolyte (not shown), and a housing 109. In the power storage device 110 illustrated in FIG. 6B, the separator 107, which is placed between the positive electrode 103 and the negative electrode 106 provided in a space surrounded by the housing 109, is impregnated with the electrolyte.

Respective materials similar to the power storage device 100 can be used for the positive electrode current collector 101, the positive electrode active material layer 102, the negative electrode current collector 104, the negative electrode active material layer 105, and the housing 109 in the power storage device 110.

In the power storage device 110, the separator 107 is preferably a porous film. As a material for the porous film, a glass fiber, a synthetic resin material, a ceramic material, or the like can be used. In addition, a material similar to the electrolyte in the power storage device 100 can be used for the electrolyte with which the separator 107 is impregnated.

Next, a method for fabricating the power storage device 100, 110 is described. Hereinafter, description is made for a lithium ion capacitor given as an example of a power storage device.

First, the positive electrode active material layer 102 is formed over the positive electrode current collector 101, so that the positive electrode 103 is fabricated. The positive electrode active material layer 102 can be formed by a coating method or a sputtering method using the above-described material. When the positive electrode active material layer 102 is formed by a coating method, organic solvent at a volume which is equal or substantially equal to that of the mixture of a conductive additive and a binder is mixed to a mixture of a positive electrode active material, a conductive additive, and a binder, thereby making slurry. Note that the mixture which is made of the positive electrode active material, the conductive additive, the binder, or the like into the slurry state is referred to as the slurry. As the solvent, N-methyl-2pyrrolidone, lactic acid ester, or the like can be used. The proportions of the active material, the conductive additive, and the binder are preferably adjusted as appropriate in such a manner that, for example, when the adhesion between the active material and the conductive additive is poor upon film formation, the amount of binder is increased, and when the resistance of the active material is high, the amount of conductive additive is increased. The mixture ratio (in weight ratio wt %) of the positive electrode active material: conductive additive: binder may be, for example, 55:5:40 to 80:5:15.

In this embodiment, the slurry is dripped on the positive electrode current collector 101 and is thinly spread by a casting method. Then, the slurry is further rolled out by a roller press machine so that the thickness is made uniform, and is subjected to vacuum drying (under a pressure of less than or equal to 10 Pa) or heat drying (at temperatures of from 150° C. to 280° C.). Thus, the positive electrode active material layer 102 is formed over the positive electrode current collector 101. The drying temperature depends on the upper temperature limit of the binder and is thus adjusted as appropriate. The thickness of the positive electrode active material layer 102 is adjusted to be an appropriate thickness in the range of 20 μm to 200 μm. It is preferable to adjust the thickness of the positive electrode active material layer 102 as appropriate so that cracks and separation do not occur. Further, it is preferable that generation of cracks and separation in the positive electrode active material layer 102 be prevented even when the electrode is rolled into a cylinder shape, though it depends on a form of the battery.

In the case where the porous graphite described in Embodiment 1 is used as the positive electrode active material, the diameter of the particle is 1 μm to 50 μm, which makes it more easily to handle the particle and to fabricate an electrode than nanoparticles.

Next, the negative electrode active material layer 105 is formed over the negative electrode current collector 104, so that the negative electrode 106 is fabricated. The negative electrode active material layer 105 can be formed by a coating method, a sputtering method, or a plasma-enhanced CVD method using the above-described material. Alternatively, in the case where the negative electrode active material layer 105 is formed by a coating method, the negative electrode active material layer 105 can be formed in a manner similar to that of the positive electrode active material layer 102 by mixing a conductive additive, a binder, or the like to the negative electrode active material. Note that the respective above-described materials can be used as the conductive additive and the binder. The mixture ratio (in weight ratio wt %) of the negative electrode active material: conductive additive: binder may be, for example, 55:5:40 to 80:5:15.

In the case where silicon is used for the negative electrode active material layer 105, a microcrystalline silicon film may be formed and then amorphous silicon may be removed from the microcrystalline silicon by etching. By the removal of amorphous silicon from microcrystalline silicon, the surface area of the remaining microcrystalline silicon is increased. The microcrystalline silicon film may be formed by a plasma-enhanced CVD method or a sputtering method.

In the case where the porous graphite described in Embodiment 1 is used as the negative electrode active material, the diameter of the particle is 1 μm to 50 μm, which makes it more easily to handle the particle and to fabricate an electrode than nanoparticles.

Next, the negative electrode active material layer 105 is pre-doped with lithium. As the pre-doping with lithium, a lithium layer may be formed on a surface of the negative electrode active material layer 105 by a sputtering method. Alternatively, a lithium foil may be provided on the surface of the negative electrode active material layer 105, whereby the negative electrode active material layer 105 can be pre-doped with lithium. The pre-doping can be performed, for example, by applying a voltage of 0 V to 3 V between a reference electrode and the negative electrode 106 in which the negative electrode active material layer is formed on the negative electrode current collector in a separately prepared electrolyte including lithium ions.

Next, the separator 107 is provided between the positive electrode 103 and the negative electrode 106 in the space surrounded by the housing 109, and the space surrounded by the housing 109 is filled with the electrolyte 108. In this manner, the power storage device 100 can be fabricated. In the power storage device 110, the separator 107 impregnated with the electrolyte may be provided between the positive electrode 103 and the negative electrode 106 in the space surrounded by the housing 109.

Since the diameter of the particle of the porous graphite described in Embodiment 1 is 1 μm to 50 μm, the electrode can be fabricated easily by using the porous graphite for at least one of the positive electrode active material and the negative electrode active material. Further, since that particle has a large specific surface area, the resistance of the electrode can be reduced by using that particle for at least one of the positive electrode active material and the negative electrode active material. Moreover, that reduction in the resistance of the electrode enables a power storage device to be provided with high output properties by pre-doping.

Figure 7:
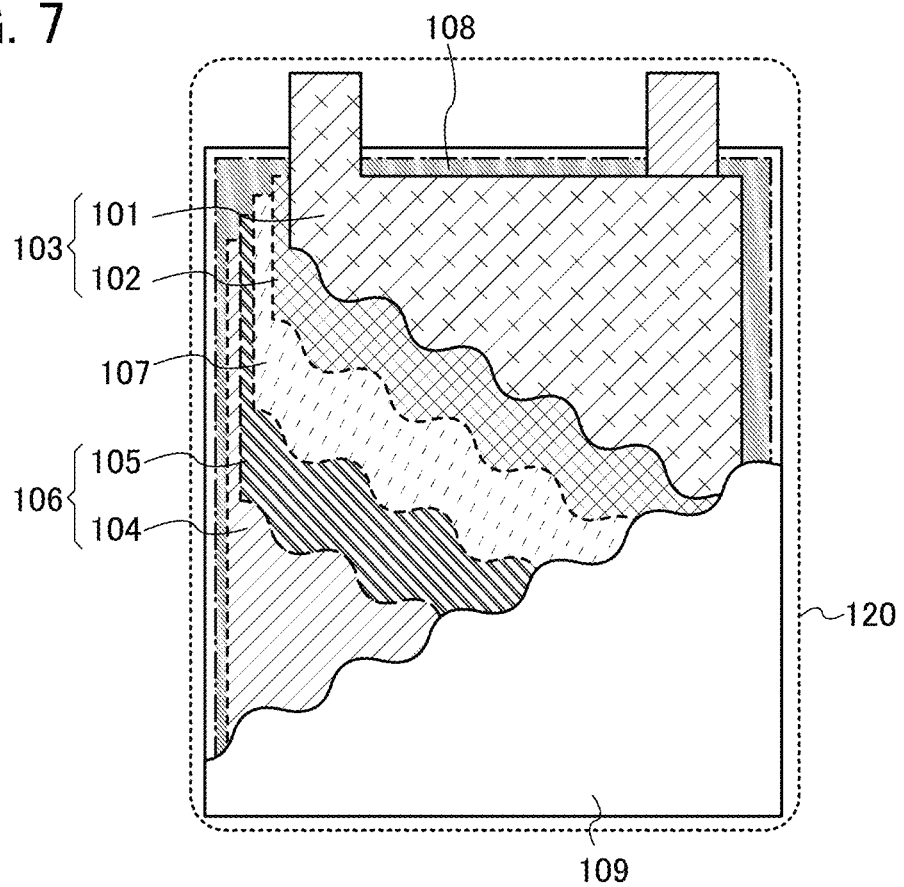
FIG. 7 illustrates a power storage device.

Next, an example of a laminated power storage device is described using FIG. 7.

A laminated power storage device 120 illustrated in FIG. 7 includes a positive electrode 103 including a positive electrode current collector 101 and a positive electrode active material layer 102, a negative electrode 106 including a negative electrode current collector 104 and a negative electrode active material layer 105, a separator 107, an electrolyte 108, and a housing 109. The separator 107 is placed between the positive electrode 103 and the negative electrode 106 in a space surrounded by the housing 109. The space surrounded by the housing 109 is filled with the electrolyte 108.

In the power storage device 120 illustrated in FIG. 7, the positive electrode current collector 101 and the negative electrode current collector 104 also function as terminals for electrical contact with the outside. Therefore, each of the positive electrode current collector 101 and the negative electrode current collector 104 is provided to be partly exposed on the outside of the housing 109.

For the housing 109 of the laminated power storage device 120, a laminate film, a polymer film, a metal film, or the like is preferably used.

Figure 8:
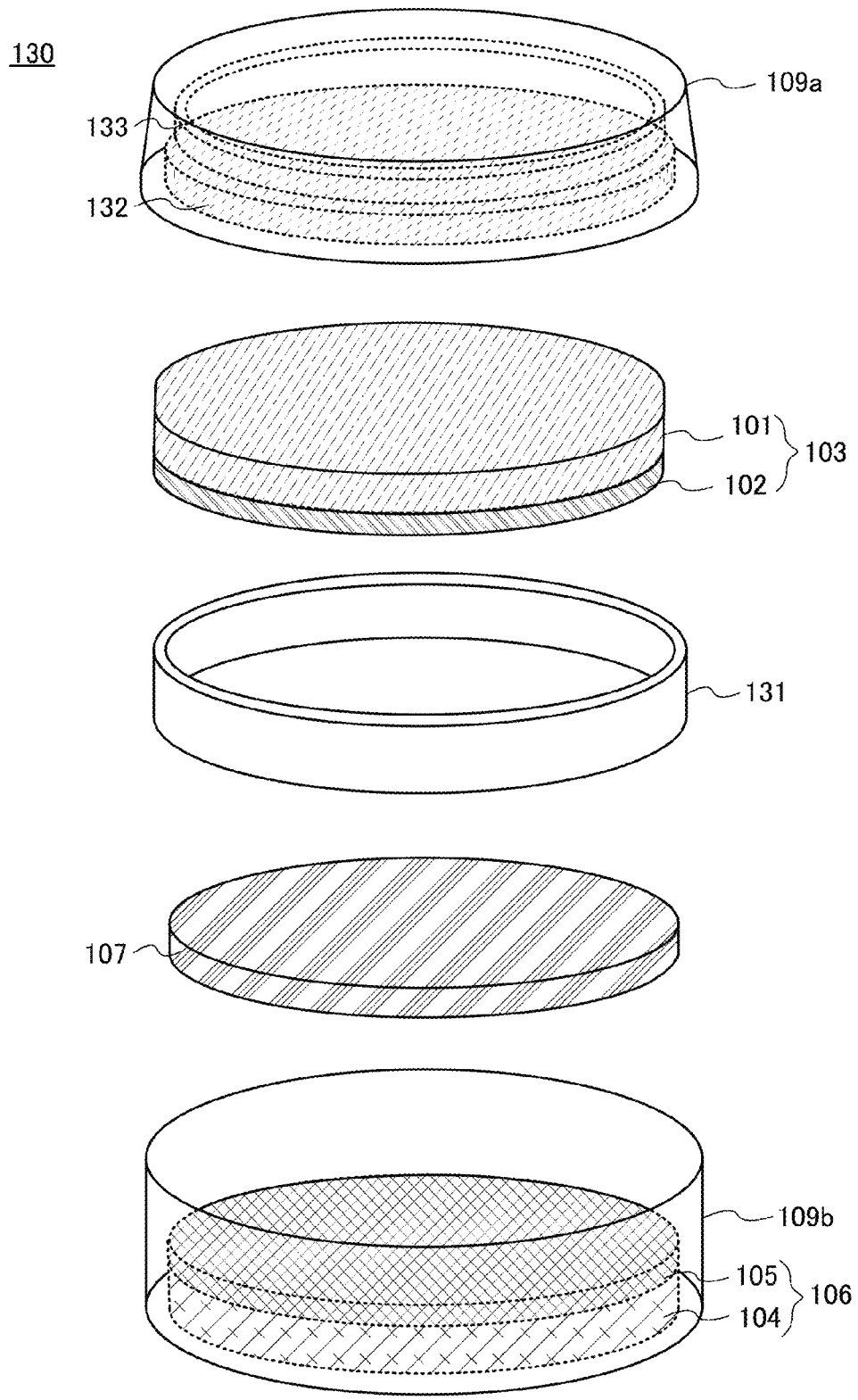
FIG. 8 illustrates a power storage device.

Next, an example of a coin-type power storage device is described using FIG. 8.

A coin-type power storage device 130 illustrated in FIG. 8 includes a positive electrode 103 including a positive electrode current collector 101 and a positive electrode active material layer 102, a negative electrode 106 including a negative electrode current collector 104 and a negative electrode active material layer 105, a separator 107, an electrolyte (not shown), and housings 109a and 109b. In addition, a ring insulator 131, a spacer 132, and a washer 133 are included.

Metals (for example, stainless steels) are preferably used for the housings 109a and 109b, the spacer 132, and the washer 133. The housing 109a and the housing 109b allow the positive electrode 103 and the negative electrode 106 to electrically contact with the outside.

The positive electrode 103, the negative electrode 106, and the separator 107 are impregnated with the electrolyte, and as shown in FIG. 8, the hosing 109b, the negative electrode 106, the separator 107, the ring insulator 131, the positive electrode 103, spacer 132, the washer 133, and the hosing 109a are stacked in this order from the bottom. Then, the housings 109a and 109b are bonded to each other with pressure. In this manner, the coin-type power storage device can be fabricated.

Although examples of the laminated power storage device and the coin-type power storage device are described in this embodiment, any power storage device according to one embodiment of the present invention is not limited thereto. Various structures can be employed for the power storage device; for example, a stack-type power storage device or a cylinder-type power storage device can be fabricated.

Although the structures of the lithium ion capacitor and the fabricating methods thereof are described using FIGS. 6A and 6B, and FIGS. 7 and 8, any power storage device according to one embodiment of the present invention is not limited thereto. As an example of the power storage device according to one embodiment of the present invention, a lithium ion secondary battery can be given.

This embodiment can be implemented in appropriate combination with any structure described in any other embodiment.

Embodiment 3

The power storage device according to one embodiment of the present invention can be used as a power supply for various electrical devices which are driven by electric power.

Specific examples of the electrical devices utilizing the power storage device according to one embodiment of the present invention are as follows: display devices, lighting devices, desktop personal computers and laptop personal computers, image reproduction devices which reproduce still images and moving images stored in recording media such as digital versatile discs (DVDs), mobile phones, portable game machines, portable information terminals, e-book readers, cameras such as video cameras and digital still cameras, high-frequency heating appliances such as microwave ovens, electric rice cookers, electric washing machines, air-conditioning systems such as air conditioners, electric refrigerators, electric freezers, electric refrigerator-freezers, freezers for preserving DNA, and medical electrical equipment such as dialyzers. In addition, moving objects driven by an electric motor using electric power from a power storage device are also included in the category of the electrical devices. As examples of the moving objects, electric vehicles, hybrid vehicles which include both an internal-combustion engine and a motor, motorized bicycles including motor-assisted bicycles, and the like can be given.

In the electrical devices, the power storage device according to one embodiment of the present invention can be used as a power storage device for supplying electric power for almost all the power consumption (referred to as a main power supply). In the electrical devices, the power storage device according to one embodiment of the present invention can also be used as a power storage device which can supply power to the electrical device when the supply of power from the main power supply or a commercial power supply is stopped (such a power storage device is referred to as an uninterruptible power supply). Further, in the electrical devices, the power storage device according to one embodiment of the present invention can also be used as a power storage device for supplying electric power to the electrical devices, which is used together with power supply with the main power supply or a commercial power supply (the power storage device is referred to as an auxiliary power supply).

Figure 9:
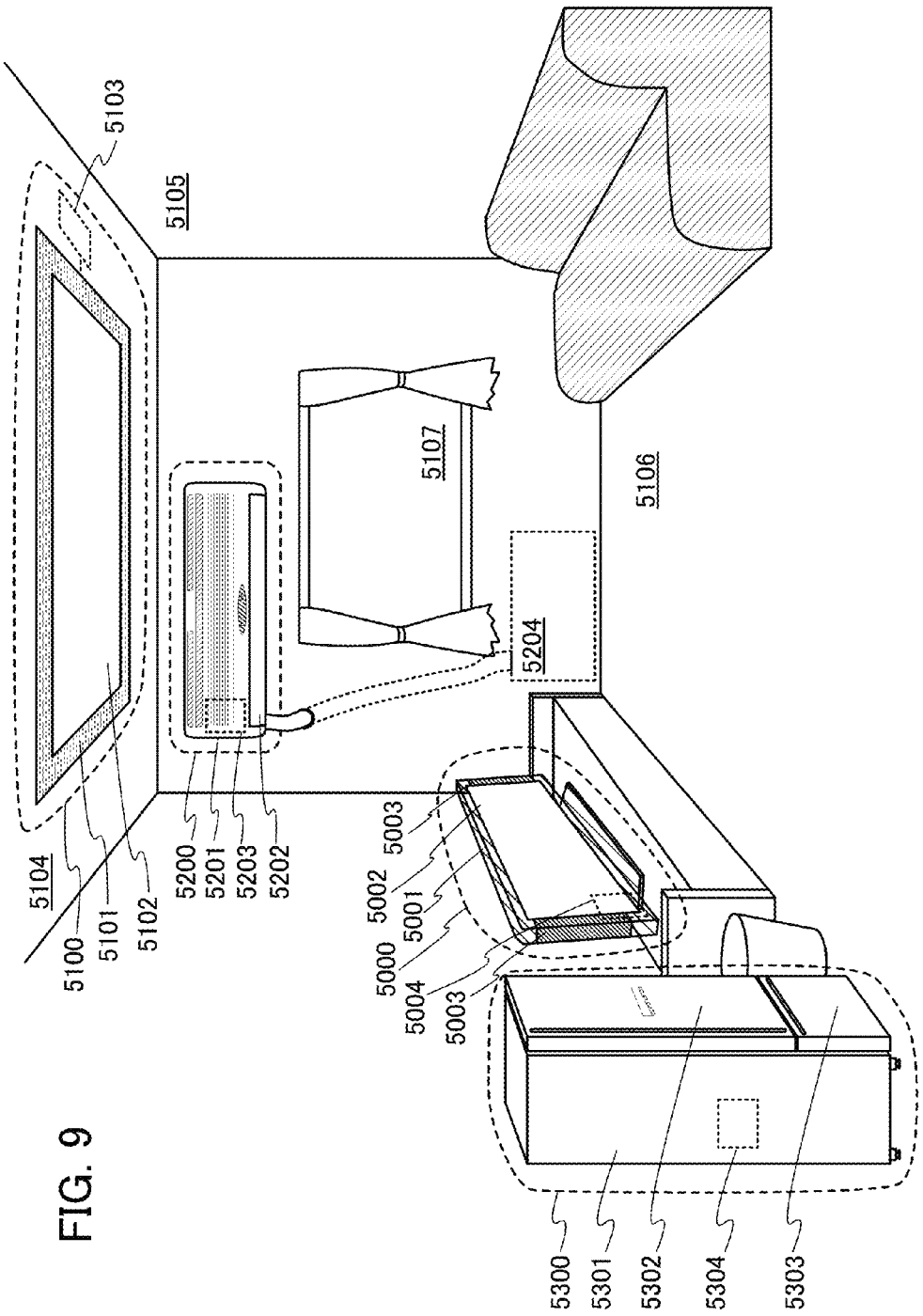
FIG. 9 illustrates electrical equipment.

FIG. 9 shows specific structures of the electrical devices. In FIG. 9, a display device 5000 is an example of an electrical device including a power storage device 5004 according to one embodiment of the present invention. Specifically, the display device 5000 corresponds to a display device for TV broadcast reception and includes a housing 5001, a display portion 5002, speaker portions 5003, the power storage device 5004, and the like. The power storage device 5004 according to one embodiment of the present invention is provided inside the housing 5001. The display device 5000 can receive electric power from a commercial power supply, and also or instead, can use electric power stored in the power storage device 5004. Thus, the display device 5000 can be operated with use of the power storage device 5004 according to one embodiment of the present invention as an uninterruptible power supply even when electric power cannot be supplied from the commercial power supply because of power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 5002.

Note that the display device includes, in its category, any information display device for personal computers, advertisement displays, and the like in addition to any information display device for TV broadcast reception.

In FIG. 9, an installation lighting device 5100 is an example of an electronic device including a power storage device 5103 according to one embodiment of the present invention. Specifically, the lighting device 5100 includes a housing 5101, a light source 5102, the power storage device 5103, and the like. FIG. 9 illustrates the case where the power storage device 5103 is provided in a ceiling 5104 on which the housing 5101 and the light source 5102 are installed; alternatively, the power storage device 5103 may be provided in the housing 5101. The lighting device 5100 can receive electric power from a commercial power supply, and also or instead, can use electric power stored in the power storage device 5103. Thus, the lighting device 5100 can be operated with use of the power storage device 5103 according to one embodiment of the invention as an uninterruptible power supply even when power cannot be supplied from the commercial power supply due to power failure or the like.

Although the installation lighting device 5100 provided on the ceiling 5104 is illustrated in FIG. 9 as an example, the power storage device according to one embodiment of the present invention can also be used for an installation lighting device provided for, for example, a side wall 5105, a floor 5106, a window 5107, or the like other than the ceiling 5104. Further, the power storage device can also be used for a tabletop lighting device or the like.

As the light source 5102, an artificial light source which emits light artificially by using electric power can be used. Specifically, a discharge lamp such as an incandescent lamp and a fluorescent lamp, and a light-emitting element such as an LED and an organic EL element are given as examples of the artificial light source.

In FIG. 9, an air conditioner including an indoor unit 5200 and an outdoor unit 5204 is an example of an electrical device including a power storage device 5203 according to one embodiment of the present invention. Specifically, the indoor unit 5200 includes a housing 5201, a ventilation duct 5202, the power storage device 5203, and the like. FIG. 9 illustrates the case where the power storage device 5203 is provided in the indoor unit 5200; alternatively, the power storage device 5203 may be provided in the outdoor unit 5204. Further alternatively, the power storage devices 5203 may be provided in both the indoor unit 5200 and the outdoor unit 5204. The air conditioner can receive power from a commercial power supply, and also or instead, can use power stored in the power storage device 5203. Specifically, in the case where the power storage devices 5203 are provided in both the indoor unit 5200 and the outdoor unit 5204, the air conditioner can be operated with use of the power storage device 5203 according to one embodiment of the present invention as an uninterruptible power supply even when electric power cannot be supplied from the commercial power supply because of power failure or the like.

Although the separated air conditioner including the indoor unit and the outdoor unit is illustrated in FIG. 9 as an example, the power storage device according to one embodiment of the present invention can be used in an air conditioner in which the functions of an indoor unit and an outdoor unit are integrated in one housing.

In FIG. 9, an electric refrigerator-freezer 5300 is an example of an electrical device including a power storage device 5304 according to one embodiment of the present invention. Specifically, the electric refrigerator-freezer 5300 includes a housing 5301, a refrigerator door 5302, a freezer door 5303, the power storage device 5304, and the like. The power storage device 5304 is provided in the housing 5301 in FIG. 9. The electric refrigerator-freezer 5300 can receive electric power from a commercial power supply, and also or instead, can use electric power stored in the power storage device 5304. Thus, the electric refrigerator-freezer 5300 can be operated with use of the power storage device 5304 according to one embodiment of the present invention as an uninterruptible power supply even when electric power cannot be supplied from the commercial power supply because of power failure or the like.

Among the electrical devices described above, a high-frequency heating apparatus such as a microwave and an electrical device such as an electric rice cooker require high power in a short time. The tripping of a circuit breaker of a commercial power supply in use of the electrical device can be prevented by using the power storage device according to one embodiment of the present invention as an auxiliary power supply for supplementing electric power to electric power supplied by the commercial power supply.

In addition, in a time period when electrical devices are not used, specifically when the rate of actual use of electric power to the total amount of electric power which can be supplied by a commercial power supply source (such a rate referred to as a usage rate of electric power) is low, electric power can be stored in the power storage device, whereby the usage rate of electric power can be reduced in a time period when the electric devices are used. For example, in the case of the electric refrigerator-freezer 5300, electric power can be stored in the power storage device 5304 at night time when the temperature is low and the refrigerator door 5303 and the freezer door 5302 are not opened. Then, the power storage device 5304 can be used as an auxiliary power supply in daytime when the temperature is high and the refrigerator door 5303 and the freezer door 5302 are opened and closed; thus, the usage rate of electric power in daytime can be suppressed.

Figure 10:
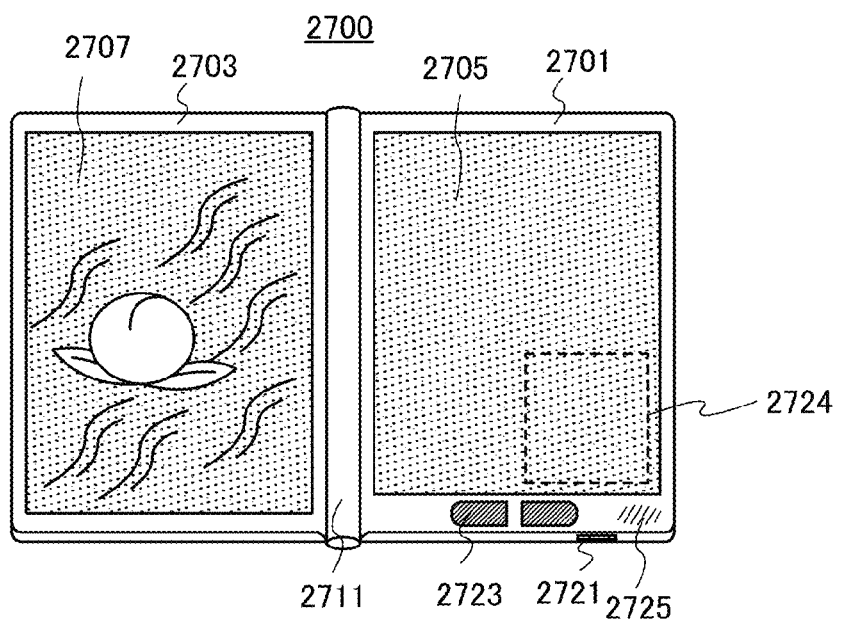
FIG. 10 illustrates electrical equipment.

FIG. 10 illustrates an e-book reader 2700, which is an example of an electrical device using the power storage device according to one embodiment of the present invention. Specifically, the e-book reader 2700 includes two housings, a housing 2701 and a housing 2703. The housings 2701 and 2703 are bound with each other by an axis portion 2711 so that the e-book reader 2700 is opened and closed along the axis portion 2711. With such a structure, the e-book reader 2700 can be handled like a paper book.

A display portion 2705 and a display portion 2707 are incorporated in the housing 2701 and the housing 2703, respectively. Respective images displayed on the display portion 2705 and the display portion 2707 constitute either one image or different images. In the case where the display portion 2705 and the display portion 2707 display different images, for example, the display portion on the right side (the display portion 2705) can display text and the display portion on the left side (the display portion 2707) can display graphics.

FIG. 10 illustrates an example in which the housing 2701 is provided with an operation portion and the like. For example, the housing 2701 is provided with a power switch 2721, an operation key 2723, a speaker 2725, a power storage device 2724, and the like. With the operation key 2723, pages can be turned. A keyboard, a pointing device, or the like may also be provided on a display portion of the housing. Furthermore, an external connection terminal (e.g., an earphone terminal, or a terminal that can be connected to various cables such as a USB cable or an AC adapter), a recording medium insertion portion, and the like may be provided on the back surface or the side surface of the housing.

The e-book reader 2700 can receive electric power from a commercial power supply, and also or instead, can use electric power stored in the power storage device 2724. Thus, the e-book reader 2700 can be operated with the use of the power storage device 2724 according to one embodiment of the present invention as an uninterruptible power supply even when electric power cannot be supplied from the commercial power supply due to power failure or the like.

The e-book reader 2700 may be configured to transmit and receive data wirelessly. Through wireless communication, desired book data or the like can be purchased and downloaded from an electronic book server.

This embodiment can be implemented in appropriate combination with any of the above-described embodiments.

Example 1

In this example, results from comparison of respective physical properties of active materials for a power storage device according to one embodiment of the present invention are described.

Respective methods for producing Samples A to C used in this example are described using FIGS. 1, 2, and 4.

First, a method for producing Sample A is described. To a 1000-mL conical flask, 116 mL of concentrated sulfuric acid was added, 2 g of graphite powder (flake graphite) was added, and then the mixture was stirred in an ice bath. Then, 12 g (0.076 mol) of potassium permanganate was slowly added to this suspension as an oxidizer and stirred, the mixture was reacted for 2 hours at room temperature and then reacted for 30 minutes at 35° C., and then pure water was added thereto and the aqueous solution was heated for 15 minutes at about 98° C. Further, 36 mL of hydrogen peroxide solution at 30 weight % was added thereto, and pure water was further added to the mixture, whereby the oxidizer was deactivated. The resulting suspension contains a sulfate ion, a manganese ion, and the like in addition to graphite oxide. The suspension was subjected to filtration. In this manner, the residue (graphite oxide) was obtained (the process from Step S11 to Step S20 described in FIG. 1).

Diluted hydrochloric acid is added to the resulting residue, and the mixture is subjected to filtration. Further, diluted hydrochloric acid is added to the resulting residue, and the mixture is subjected to filtration. After the cleaning, pure water was added to the resulting residue, the resulting suspension was subjected to centrifugation at 3000 rpm for 30 minutes, and then the supernatant solution was removed. Pure water was added to the resulting sediment, centrifugation was performed thereon, and the supernatant solution was removed; that process was repeated plural times. After the supernatant solution was removed, the sediment was dried to yield a red-brown solid which is an object (the process from Step S21 to Step S26 described in FIG. 1).

Next, pure water was added to the red-brown solid, ultrasonic waves were applied thereto, and the resulting mixture was dried, yielding a yellow-brown solid. Then, 2 mL (0.022 mol) of aqueous solution of zinc chloride at 1.5 g/mL was added to 1 g of the yellow-brown solid, and the suspension was dried, yielding a mixture (the process from the circled 1 to Step S35 described in FIG. 2).

The mixture was heated at 650° C. under a nitrogen atmosphere for 1 hour, yielding a gray sintered compact. Diluted hydrochloric acid was added to the sintered compact, pure water was added thereto to clean the suspension, and then, the suspension was filtered. The process consisting of addition of pure water to the residue, and cleaning and filtration of the suspension was repeated plural times. The residue was dried and then ground with a ball mill, yielding 0.54 g of gray powder which is an object (the process from Step S36 to End described in FIG. 2). Through the above-described process, Sample A was produced.

Next, a method for producing Sample B is described. For Sample B, the process from Step S11 to Step S26 described in FIG. 1 was performed in a similar manner to Sample A, yielding a yellow-brown solid which is an object.

Next, pure water was added to 0.5 g of the yellow-brown solid, an aqueous solution of zinc chloride in which 3 g of zinc chloride was dissolved in 300 mL of pure water was added thereto, ultrasonic waves were applied to the suspension while stirring, and then the resulting suspension was dried, yielding a mixture (the process from Step S51 to Step S54 described in FIG. 3).

The mixture was heated at 650° C. under a nitrogen atmosphere for 1 hour, whose step is a first baking, yielding a black sintered compact. Diluted hydrochloric acid was added to the sintered compact, pure water was added thereto to clean the suspension, and then, the suspension was filtered. The process consisting of addition of pure water to the residue, and cleaning and filtration of the suspension was repeated plural times. The residue was dried and then ground with a ball mill, yielding 0.22 g of black powder which is an object (the process from Step S55 to S60 described in FIG. 3). Through the above-described process, Sample B was produced.

Next, a method for producing Sample C is described. For Sample C, the process from Step S11 to Step S26 described in FIG. 1 was performed in a similar manner to Sample A, yielding a yellow-brown solid which is an object.

Next, pure water was added to 1.5 g of the yellow-brown solid, an aqueous solution of zinc chloride in which 2 g of zinc chloride was dissolved in 300 mL of pure water was added thereto, ultrasonic waves were applied to the suspension while stirring, and then the resulting suspension was dried, yielding a mixture (the process from Step S51 to Step S54 described in FIG. 3).

The mixture was heated at 650° C. under a nitrogen atmosphere for 1 hour, whose step is a first baking, yielding a gray sintered compact. Diluted hydrochloric acid was added to the sintered compact, pure water was added thereto to clean the suspension, and then, the suspension was filtered. The process consisting of addition of pure water to the residue, and cleaning and filtration of the suspension was repeated plural times. The residue was dried and then ground with a ball mill (the process from Step S55 to S60 shown in FIG. 3). Further, a second baking was performed on the ground gray powder. The baking was performed at 1200° C. under a nitrogen atmosphere for 1 hour (Step S61 shown in FIG. 3). Through the above-described process, Sample C was produced.

As Comparison Sample D, graphite (flake graphite) was prepared.

Figure 11A:
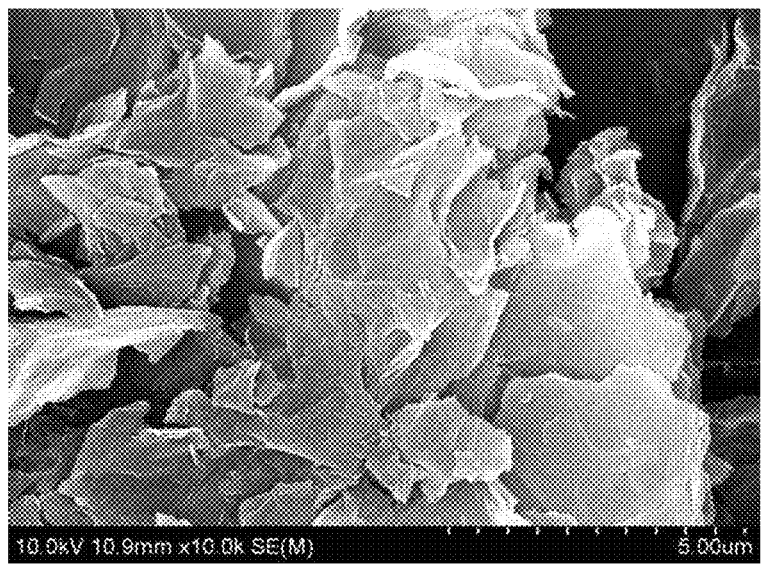
FIGS. 11A and 11B are SEM images of Sample A and Sample B, respectively.
Figure 11B:
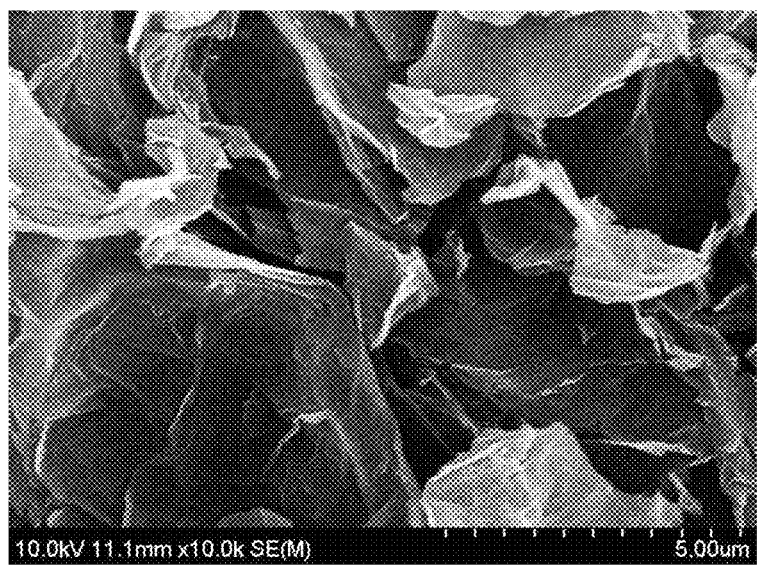
Figure 12A:
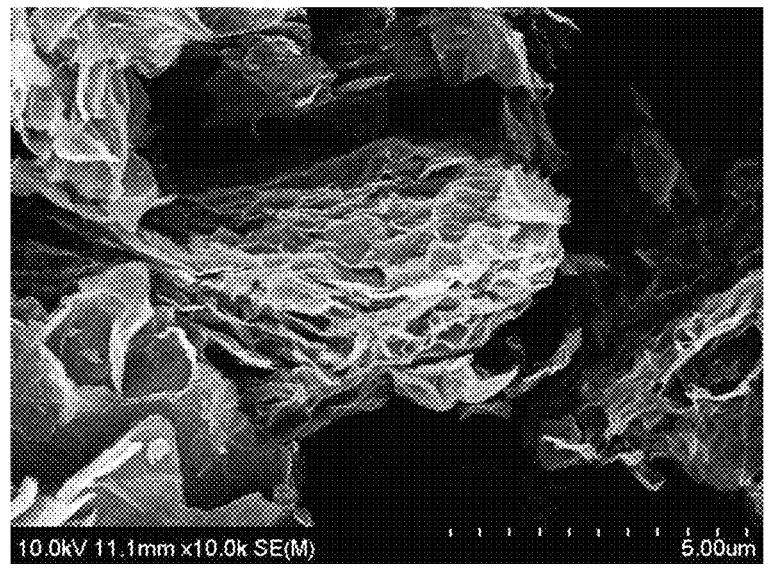
FIGS. 12A and 12B are SEM images of Sample C and Comparison Sample D, respectively.
Figure 12B:
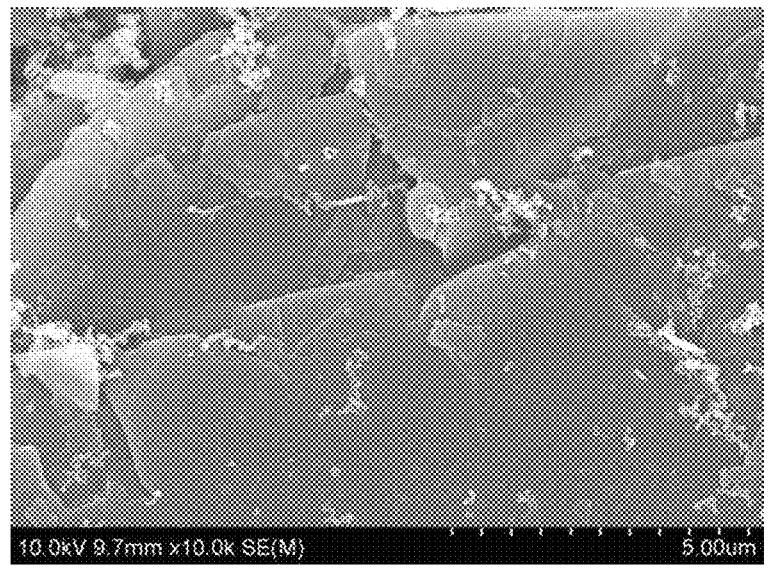

Samples A to C and Comparison Sample D were observed by a scanning electron microscope (SEM). FIG. 11A is a SEM image of Sample A (at a magnification of 10000 times);

FIG. 11B is a SEM image of Sample B (at a magnification of 10000 times); and FIG. 12A is a SEM image of Sample C (at a magnification of 10000 times). FIG. 12B is a SEM image of Comparison Sample D (at a magnification of 10000 times).

As shown in FIGS. 11A, 11B, and 12A, a plurality of slices of graphite is overlapped with each other with a gap therebetween in each of Samples A to C.

It is also seen that there are more gaps in FIG. 11B than in FIG. 11A. This seems to be because the dispersibility of graphite oxide and zinc chloride is increased by zinc chloride added before application of ultrasonic waves at Steps S52 and S53 in FIG. 3.

Next, the specific surface areas of Samples A to C and Comparison Sample D were measured. For the measurement, a micromeritics automatic surface area and porosimetry analyzer (Trister II 3020 manufactured by SHIMADZU CORPORATION) was used. In the micromeritics automatic surface area and porosimetry analyzer, gas molecules whose adsorption occupancy areas are known are adsorbed onto surfaces of particles of a sample, from the amount of which the specific surface of the sample is calculated. The porosimetry was calculated by a BJH (Barrett, Joyner, and Halenda) method in which the pore size is obtained from a desorption isotherm that is a relation between adsorbed amount and relative pressure upon desorption of the adsorbate.

Figure 13:
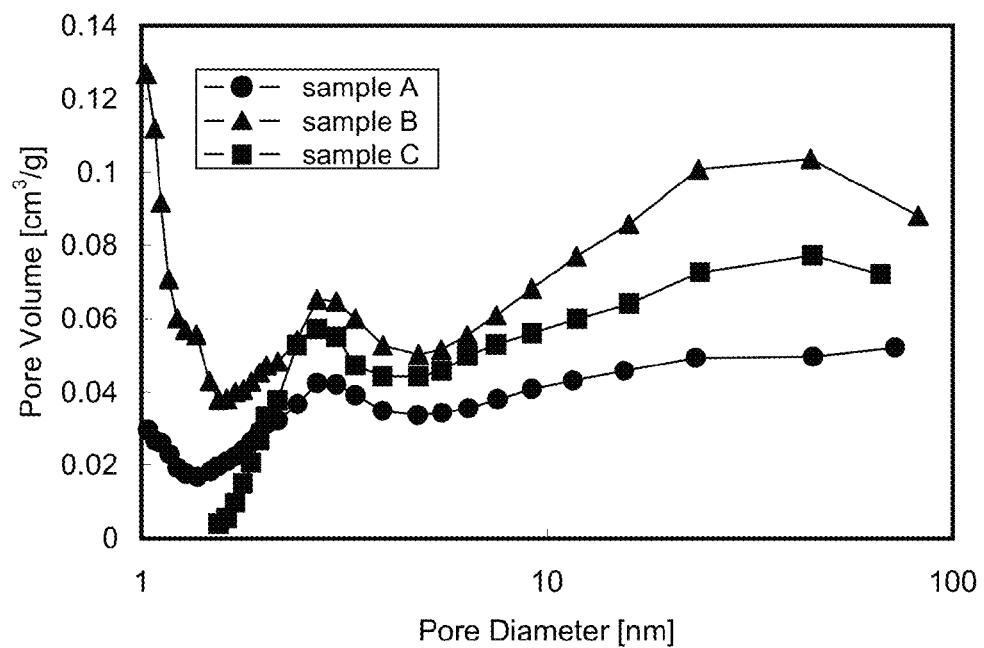
FIG. 13 is a graph showing respective pore distribution of Samples A to C.

FIG. 13 shows a relation between pore diameter and pore volume. The horizontal axis indicates the pore diameter and the vertical axis indicates the pore volume. In FIG. 13, the relation of Sample A is plotted with circles; the relation of Sample B is plotted with triangles; and the relation of Sample C is plotted with squares.

It is found from FIG. 13 that any pore with a pore diameter of 1 nm to 2 nm disappeared in Sample C.

Figure 14:
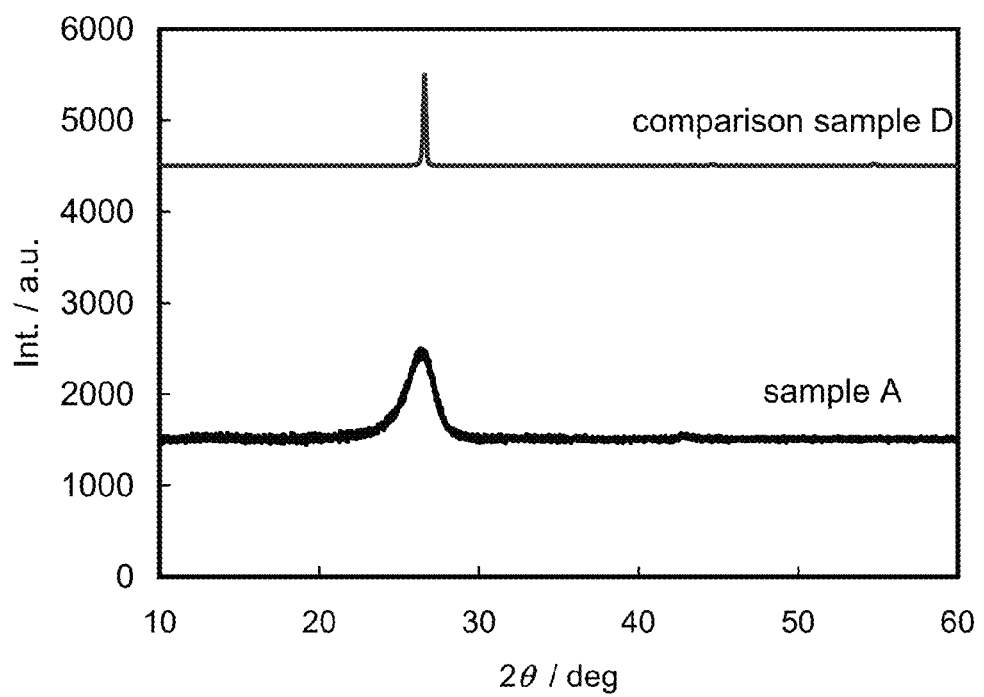
FIG. 14 is a graph showing respective XRD spectra of Sample A and Comparison Sample D.

Next, X-ray diffraction (XRD) of Sample A and Comparison Sample D were measured. The results of XRD are shown in FIG. 14. A peak around at 2θ of 26.4°, which seems to be attributed to graphite which is Comparison Sample D, was recognized in Sample A from FIG. 14. It can accordingly be confirmed that Sample A has a crystalline structure similar to the crystalline structure of Comparison Sample D.

Next, lithium ion capacitors were fabricated, and results of their characterization are described below.

Fabrication methods of Cells F to H and Comparison Cells I and J for characterization used in this example are described.

First, a method for fabricating Cell F is described.

First, a conductive additive and a binder were mixed to an active material, whereby slurry was produced. Sample A produced in this example, carbon black (manufactured by DENKI KAGAKU KOGYO KABUSHIKI KAISHA), and polyvinylidene fluoride (PVDF manufactured by KISHIDA CHEMICAL Co., Ltd.) were used as the active material, the conductive additive, and the binder, respectively at a mixture ratio of 80:5:15 (Sample A:carbon black:PVDF) by weight (wt %), to which N-methyl-2pyrrolidone was added as an organic solvent, whereby the slurry was prepared. Then, the slurry was applied over a current collector, dried at 70° C. for 20 minutes under the atmospheric atmosphere (with a circulation dryer), and then was subjected to a drying step at 170° C. for 10 hours. In this manner, an electrode was fabricated. Copper foil (manufactured by HONJO KINZOKU. CO., LTD.) was used as the current collector. The thickness of the active material layer was 63 μm.

Next, the electrode was pre-doped with lithium. With the pre-doping, the electrode was doped with lithium at 1078 mAh/g.

A positive electrode, a separator impregnated with an electrolyte, a negative electrode, and a base cell manufactured by Japan Tomcell, Tomcell TJ-AC were assembled to construct Cell F. The above-described lithium-doped electrode was used as the negative electrode, and for the other positive electrode, electrolyte, and separator, commercially available ones were used. Specifically, an electrode sold by TAKUMI GIKEN CORPORATION was used as the positive electrode, in which aluminum foil was used for the positive electrode current collector, and active carbon/conductive material/styrene-butadiene rubber (SBR)/carboxy methyl cellulose (CMC) (=90/10/2/2) was used for the positive electrode active material layer. As the electrolyte, an electrolyte in which lithium hexafluorophosphate ($LiPF_6$) was dissolved as an electrolyte salt at a concentration of 1 mol/L in a mixed solvent in which ethylene carbonate (EC) and ethyl methyl carbonate (EMC) were mixed at a volume ratio of 3:7 was used. Glass fiber manufactured by Watt Mann Co., Ltd. was used for the separator. The separator was impregnated with the electrolyte.

Next, a method for fabricating Cell G is described.

First, a conductive additive and a binder were mixed to an active material, whereby slurry was produced. Sample B produced in this example, carbon black (manufactured by DENKI KAGAKU KOGYO KABUSHIKI KAISHA), and PVDF (manufactured by KISHIDA CHEMICAL Co., Ltd.) were used as the active material, the conductive additive, and the binder, respectively at a mixture ratio of 75:5:20 (Sample B:carbon black:PVDF) by weight (wt %), to which N-methyl-2pyrrolidone was added as an organic solvent, whereby the slurry was prepared. Then, the slurry was applied over a current collector, dried at 70° C. for 20 minutes under the atmospheric atmosphere (with a circulation dryer), and then was subjected to a drying step at 170° C. for 10 hours. In this manner, an electrode was fabricated. Copper foil (manufactured by HONJO KINZOKU. CO., LTD.) was used as the current collector. The thickness of the active material layer was 93 μm.

Next, the electrode was pre-doped with lithium. With the pre-doping, the electrode was doped with lithium at 1192 mAh/g.

The construction method of Cell G is similar to that of Cell F except use of the above-described electrode as the negative electrode, and thus detailed description thereof is skipped.

Next, a method for fabricating Cell H is described.

First, a conductive additive and a binder were mixed to an active material, whereby slurry was produced. Sample C produced in this example, carbon black (manufactured by DENKI KAGAKU KOGYO KABUSHIKI KAISHA), and PVDF (manufactured by KISHIDA CHEMICAL Co., Ltd.) were used as the active material, the conductive additive, and the binder, respectively at a mixture ratio of 75:5:20 (Sample C:carbon black:PVDF) by weight (wt %), to which N-methyl-2pyrrolidone was added as an organic solvent, whereby the slurry was prepared. Then, the slurry was applied over a current collector, dried at 70° C. for 20 minutes under the atmospheric atmosphere (with a circulation dryer), and then was subjected to a drying step at 170° C. for 10 hours. In this manner, an electrode was fabricated. Copper foil (manufactured by HONJO KINZOKU. CO., LTD.) was used as the current collector. The thickness of the active material layer was 100 μm.

Next, the electrode was pre-doped with lithium. With the pre-doping, the electrode was doped with lithium at 583 mAh/g.

The construction method of Cell H is similar to that of Cell F except use of the above-described electrode as the negative electrode, and thus detailed description thereof is skipped.

Next, a method for fabricating Comparison Cell I is described.

First, a conductive additive and a binder were mixed to an active material, whereby slurry was produced. Mesocarbon microbead (MBMC) with a grain diameter of 30 µm, carbon black (manufactured by DENKI KAGAKU KOGYO KABUSHIKI KAISHA), and PVDF (manufactured by KISHIDA CHEMICAL Co., Ltd.) were used as the active material, the conductive additive, and the binder, respectively at a mixture ratio of 93:2:5 (MBMC:carbon black:PVDF) by weight (wt %), to which N-methyl-2pyrrolidone was added as an organic solvent, whereby the slurry was prepared. Then, the slurry was applied over a current collector, dried under the atmospheric atmosphere (with a circulation dryer), and then was subjected to rolling, and was dried at 170° C. for 10 hours under vacuum atmosphere. In this manner, an electrode was fabricated. Copper foil (manufactured by HONJO KINZOKU. CO., LTD.) was used as the current collector. The thickness of the active material layer was 162 µm.

Next, the electrode was pre-doped with lithium. With the pre-doping, the electrode was doped with lithium at 376 mAh/g.

A positive electrode, a separator impregnated with an electrolyte, a negative electrode, and a base cell manufactured by Japan Tomcell, Tomcell TJ-AC were assembled to construct Comparison Cell I. The above-described lithium-doped electrode was used as the negative electrode, and for the other positive electrode, electrolyte, and separator, commercially available ones were used. Specifically, an electrode sold by TAKUMI GIKEN CORPORATION was used as the positive electrode, in which aluminum foil was used for the positive electrode current collector, and active carbon/conductive material/styrene-butadiene rubber (SBR)/carboxy methyl cellulose (CMC) (=90/10/2/2) was used for the positive electrode active material layer. As the electrolyte, an electrolyte in which lithium hexafluorophosphate ($LiPF_6$) was dissolved as an electrolyte salt at a concentration of 1 mol/L in a mixed solvent in which ethylene carbonate (EC) and dimethyl carbonate (DMC) were mixed at a volume ratio of 1:1 was used. As the separator, solvent-spun regenerated cellulosic fiber (TF40) manufactured by NIPPON KODOSHI CORPORATION was used. The separator was impregnated with the electrolyte.

Next, a method for fabricating Comparison Cell J is described.

First, a conductive additive and a binder were mixed to an active material, whereby slurry was produced. Mesocarbon microbead (MBMC) with a grain diameter of 6 µm, carbon black (manufactured by DENKI KAGAKU KOGYO KABUSHIKI KAISHA), and PVDF (manufactured by KISHIDA CHEMICAL Co., Ltd.) were used as the active material, the conductive additive, and the binder, respectively at a mixture ratio of 93:2:5 (MBMC:carbon black:PVDF) by weight (wt %), to which N-methyl-2pyrrolidone was added as an organic solvent, whereby the slurry was prepared. Then, the slurry was applied over a current collector, dried under the atmospheric atmosphere (with a circulation dryer), and then was subjected to rolling, and was dried at 170° C. for 10 hours under vacuum atmosphere. In this manner, an electrode was fabricated. Copper foil (manufactured by HONJO KINZOKU. CO., LTD.) was used as the current collector. The thickness of the active material layer was 146 µm.

Next, the electrode was pre-doped with lithium. With the pre-doping, the electrode was doped with lithium at 336 mAh/g.

The construction method of Comparison Cell J is similar to that of Cell F except use of the above-described electrode as the negative electrode, and thus detailed description thereof is skipped.

Next, a charge/discharge test was performed on Cells F to H and Comparison Cells I and J with a battery charge/discharge tester (HJ-1001SM8) manufactured by HOKUTO DENKO CORPORATION. Through charging/discharging at a current of 0.4 mA at a voltage of 2 V to 4 V, their respective capacitances (mAh) at a 1 C rate were measured. Their respective energy densities were also measured.

Each cell was fully charged and discharged for 110 seconds at a 3 C rate, and then, current supply to each cell was stopped for 10 seconds. The internal resistance of each cell was calculated from a value of voltage rise ΔV after the stopping of current supply. A formula for the internal resistance is:

Internal Resistance(Ω)={(voltage just before the end of discharging)−(voltage after the 10-second stopping after the discharging)}/(current in the discharging)

Figure 15:
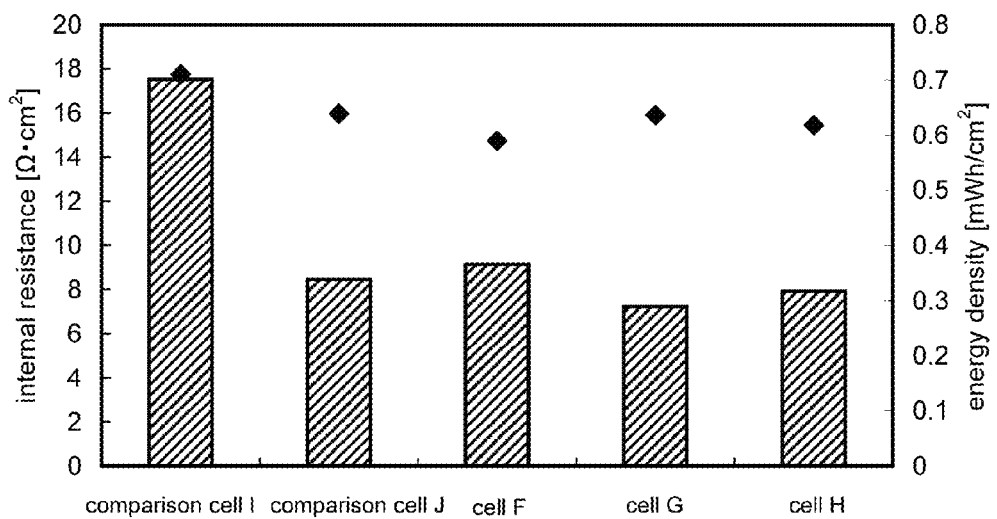
FIG. 15 is a graph showing respective internal resistance and respective energy densities of Cells F to H and Comparison Cells I and J.

In FIG. 15, bar graph and plot data show the internal resistance and the energy density of each cell, respectively. In FIG. 15, the vertical axis on the left side indicates the internal resistance [$\Omega \cdot cm^2$], and the vertical axis on the right side indicates the energy density [$mWh/cm^2$].

Comparing Comparison Cell I to Cells F to H in FIG. 15, the internal resistance of any of Cells F to H is lower than that of Comparison Cell I, though the energy density is a little higher in Comparison Cell I than in Cells F to H.

Figure 16:
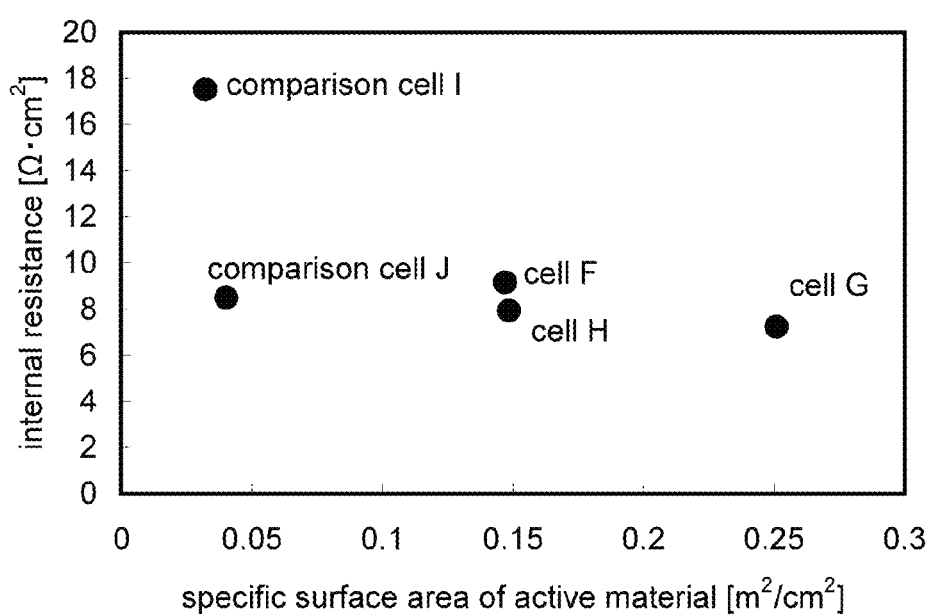
FIG. 16 is a graph showing respective specific surface areas of active material and respective internal resistance of Cells F to H and Comparison Cells I and J.

FIG. 16 shows the relation between total specific surface area of an active material and the internal resistance of each cell. In FIG. 16, the horizontal axis indicates total specific surface area of an active material [$m^2/cm^2$], and the vertical axis indicates the internal resistance [$\Omega \cdot cm^2$].

It was found from FIG. 16 that Cells F to H each have total specific surface area of an active material which is larger than that of any of Comparison Cells I and J. It is also found that the internal resistance of any of Cells F to H is lower than that of Comparison Cell I.

The foregoing results reveal that Samples A to C each are an active material whose specific surface area is large. It is also revealed that Cells F, G, and H using Samples A, B, and C, respectively, as their active materials each enable a low resistance of a battery.

EXPLANATION OF REFERENCE

100: power storage device; 101: positive electrode current collector; 102: positive electrode active material layer; 103: positive electrode; 104: negative electrode current collector; 105: negative electrode active material layer; 106: negative electrode; 107: separator; 108: electrolyte; 109: housing; 109a: housing; 109b: housing; 110: power storage device; 120: power storage device; 130: power storage device; 131: ring insulator; 132: spacer; 133: washer; 2700: e-book reader; 2701: housing; 2703: housing; 2705: display portion; 2707: display portion; 2711: axis portion; 2721: power switch; 2723: operation key; 2724: power storage device; 2725: speaker; 5000: display device; 5001: housing; 5002: display portion; 5003: speaker portion; 5004: power storage device; 5100: lighting device; 5101: housing; 5102: light source; 5103: power storage device; 5104: ceiling; 5105: side wall; 5106: floor; 5107: window; 5200: indoor unit; 5201: housing; 5202: ventilation duct; 5203: power storage device; 5204: outdoor unit; 5300: electric refrigerator-freezer; 5301: housing; 5302: refrigerator door; 5303: freezer door; 5304: power storage device This application is based on Japanese Patent Application serial no. 2011-185212 filed with Japan Patent Office on Aug. 26, 2011, the entire contents of which are hereby incorporated by reference.

The invention claimed is:

1. An electrode comprising:
   a current collector; and
   an active material layer,
   wherein the active material layer comprises an active material exclusively of a plurality of graphite particles,
   wherein each graphite particle of the plurality of graphite particles consists of a plurality of graphite layers overlapping with each other with a gap between each respective graphite layer,
   wherein the gap is 1 nm to 10 nm,
   wherein a grain diameter of the particle is 1 μm to 50 μm, and
   wherein a specific surface area of the particle is 20 $m^2/g$ to 200 $m^2/g$.

2. A power storage device comprising:
   a positive electrode comprising a positive electrode current collector and a positive electrode active material layer;
   a negative electrode comprising a negative electrode current collector and a negative electrode active material layer; and
   an electrolyte,
   wherein the negative electrode active material layer comprises an active material exclusively of a plurality of graphite particles,
   wherein each graphite particle of the plurality of graphite particles consists of a plurality of graphite layers overlapping with each other with a gap between each respective graphite layer,
   wherein the gap is 1 nm to 10 nm
   wherein a grain diameter of the particle is 1 μm to 50 μm, and
   wherein a specific surface area of the particle is 20 $m^2/g$ to 200 $m^2/g$.

3. The power storage device according to claim 2, wherein the electrolyte is in contact with the gap.

4. The power storage device according to claim 2, wherein the power storage device is a lithium ion capacitor.

5. The power storage device according to claim 2,
   wherein the positive electrode active material layer comprises a graphite particle, and
   wherein the graphite particle comprises a plurality of graphite layers overlapping with each other with a gap between each respective graphite layer.

6. A power storage device comprising:
   a positive electrode comprising a positive electrode current collector and a positive electrode active material layer;
   a negative electrode comprising a negative electrode current collector and a negative electrode active material layer; and
   an electrolyte,
   wherein the positive electrode active material layer comprises an active material exclusively of a plurality of graphite particles,
   wherein each graphite particle of the plurality of graphite particles consists of a plurality of graphite layers overlapping with each other with a gap between each respective graphite layer,
   wherein the gap is 1 nm to 10 nm,
   wherein a grain diameter of the particle is 1 μm to 50 μm, and
   wherein a specific surface area of the particle is 20 $m^2/g$ to 200 $m^2/g$.

7. The power storage device according to claim 6, wherein the electrolyte is in contact with the gap.

8. The power storage device according to claim 6, wherein the power storage device is a lithium ion capacitor.

9. The electrode according to claim 1, wherein the gap is formed using zinc chloride.

10. The electrode according to claim 1,
    wherein the gap includes space, and
    wherein a transition metal chloride is removed from the space.

11. The power storage device according to claim 2, wherein the gap is formed using zinc chloride.

12. The power storage device according to claim 2,
    wherein the gap includes space, and
    wherein a transition metal chloride is removed from the space.

13. The power storage device according to claim 6, wherein the gap is formed using zinc chloride.

14. The power storage device according to claim 6, wherein the gap includes space, and wherein a transition metal chloride is removed from the space.

* * * * *